(12) United States Patent
Chou et al.

(10) Patent No.: US 11,016,221 B2
(45) Date of Patent: May 25, 2021

(54) ANNULAR OPTICAL COMPONENT AND CAMERA LENS MODULE HAVING TAPERED PORTIONS

(71) Applicant: LARGAN PRECISION CO., LTD., Taichung (TW)

(72) Inventors: Ming-Ta Chou, Taichung (TW); Ruei-Yang Luo, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 281 days.

(21) Appl. No.: 16/024,472

(22) Filed: Jun. 29, 2018

(65) Prior Publication Data

US 2019/0324172 A1    Oct. 24, 2019

(30) Foreign Application Priority Data

Apr. 20, 2018  (TW) .................................. 107113499

(51) Int. Cl.
*G02B 1/111* (2015.01)
*G02B 7/02* (2021.01)
(Continued)

(52) U.S. Cl.
CPC .............. *G02B 1/111* (2013.01); *G02B 5/005* (2013.01); *G02B 7/021* (2013.01);
(Continued)

(58) Field of Classification Search
CPC .............. G02B 1/11–118; G02B 5/005; G02B 7/02–16; G02B 13/001; G02B 27/0018;
(Continued)

(56) References Cited

U.S. PATENT DOCUMENTS 9,581,784 B2    2/2017  Ishiguri et al.
2014/0334019 A1  11/2014  Ishiguri et al.
(Continued)

FOREIGN PATENT DOCUMENTS

CN    106802461 A    6/2017
TW       399334 B    7/2000

OTHER PUBLICATIONS

Taiwanese Office Action issued in corresponding application No. 107113499, dated Jan. 19, 2019.

*Primary Examiner* — Ryan S Dunning
(74) *Attorney, Agent, or Firm* — Maschoff Brennan

(57) ABSTRACT

An annular optical component includes an inner surface, an outer surface, an object-side surface and an image-side surface. The inner surface includes a molded anti-reflective layer structure surrounding a central axis of the annular optical component. The molded anti-reflective layer structure defines a central aperture. The outer surface includes a frame structure surrounding at least a part of the molded anti-reflective layer structure. A hardness of the frame structure is larger than a hardness of the molded anti-reflective layer structure. The object-side surface and the image-side surface respectively face toward an object side and an image side of the annular optical component. The molded anti-reflective layer structure is joined with the frame structure. The molded anti-reflective layer structure includes a tapered portion adjacent to the central aperture, and the tapered portion tapers off along a direction from the outer surface toward the inner surface.

25 Claims, 24 Drawing Sheets

(51) Int. Cl.
  *G03B 9/02* (2021.01)
  *G03B 17/12* (2021.01)
  *G02B 27/09* (2006.01)
  *G02B 5/00* (2006.01)
  *G02B 27/00* (2006.01)

(52) U.S. Cl.
  CPC ...... *G02B 27/0018* (2013.01); *G02B 27/0988* (2013.01); *G03B 9/02* (2013.01); *G03B 17/12* (2013.01)

(58) Field of Classification Search
  CPC .......... G03B 9/02–07; G03B 11/04–06; G03B 17/12; G03B 17/14
  USPC .................. 359/601, 611, 613, 819, 829, 830
  See application file for complete search history.

(56) References Cited

U.S. PATENT DOCUMENTS

| | | |
|---|---|---|
| 2017/0023762 A1 | 1/2017 | Tobita |
| 2017/0131512 A1 | 5/2017 | Ishiguri et al. |
| 2017/0307878 A1* | 10/2017 | Yatsu ................. G02B 27/0018 |
| 2018/0003891 A1* | 1/2018 | Wada ...................... B29C 45/73 |
| 2018/0003917 A1 | 1/2018 | Tobita |
| 2018/0031796 A1 | 2/2018 | Kobayashi |
| 2018/0180834 A1* | 6/2018 | Arai ....................... G02B 7/021 |

\* cited by examiner

ANNULAR OPTICAL COMPONENT AND CAMERA LENS MODULE HAVING TAPERED PORTIONS

RELATED APPLICATIONS

This application claims priority to Taiwan Application 107113499, filed on Apr. 20, 2018, which is incorporated by reference herein in its entirety.

BACKGROUND

Technical Field

The present disclosure relates to an annular optical component and a camera lens module, more particularly to an annular optical component and a camera lens module applicable to an electronic device.

Description of Related Art

With the development of semiconductor manufacturing technology, the performance of image sensors has been improved, and the pixel size thereof has been scaled down. Therefore, featuring high image quality has been one of the indispensable features of an optical system nowadays.

However, a conventional optical system does not have a proper capability of eliminating stray light. Thus, when powerful light rays are existed in the environment where an imaged object is located, unwanted light traveling into the optical system will be received by an image sensor, thereby resulting in halo effect at the periphery of the image. Specifically, the above-mentioned problems usually happen when the image object is located outdoors with sufficient amount of sunlight, or the image object is located in a dim room where a high intensity light source is existed.

SUMMARY

According to one aspect of the present disclosure, an annular optical component includes an inner surface, an outer surface, an object-side surface and an image-side surface. The inner surface includes a molded anti-reflective layer structure. The molded anti-reflective layer structure surrounds a central axis of the annular optical component, and the molded anti-reflective layer defines a central aperture. The outer surface includes a frame structure. The outer surface is opposite to the inner surface. The frame structure surrounds at least a part of the molded anti-reflective layer structure. A hardness of the frame structure is larger than a hardness of the molded anti-reflective layer structure. The object-side surface faces toward an object side of the annular optical component, and the object-side surface is connected to the outer surface and the inner surface. The image-side surface faces toward an image side of the annular optical component, and the image-side surface is connected to the outer surface and the inner surface. The image-side surface is opposite to the object-side surface. The molded anti-reflective layer structure is joined with the frame structure. The molded anti-reflective layer structure includes a tapered portion adjacent to the central aperture, and the tapered portion tapers off along a direction from the outer surface toward the inner surface.

According to another aspect of the present disclosure, a camera lens module includes the aforementioned annular optical component and an optical lens assembly. The annular optical component is disposed in the optical lens assembly.

According to still another aspect of the present disclosure, an annular optical component includes an inner surface, an outer surface, an object-side surface and an image-side surface. The inner surface includes a molded anti-reflective layer structure. The molded anti-reflective layer structure surrounds a central axis of the annular optical component, and the molded anti-reflective layer structure defines a central aperture. The outer surface includes a frame structure. The outer surface is opposite to the inner surface. The molded anti-reflective layer structure is joined with the frame structure. The frame structure surrounds at least a part of the molded anti-reflective layer structure. A hardness of the frame structure is larger than a hardness of the molded anti-reflective layer structure. The object-side surface faces toward an object side of the annular optical component, and the object-side surface is connected to the outer surface and the inner surface. The image-side surface faces toward an image side of the annular optical component, and the image-side surface is connected to the outer surface and the inner surface. The image-side surface is opposite to the object-side surface.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
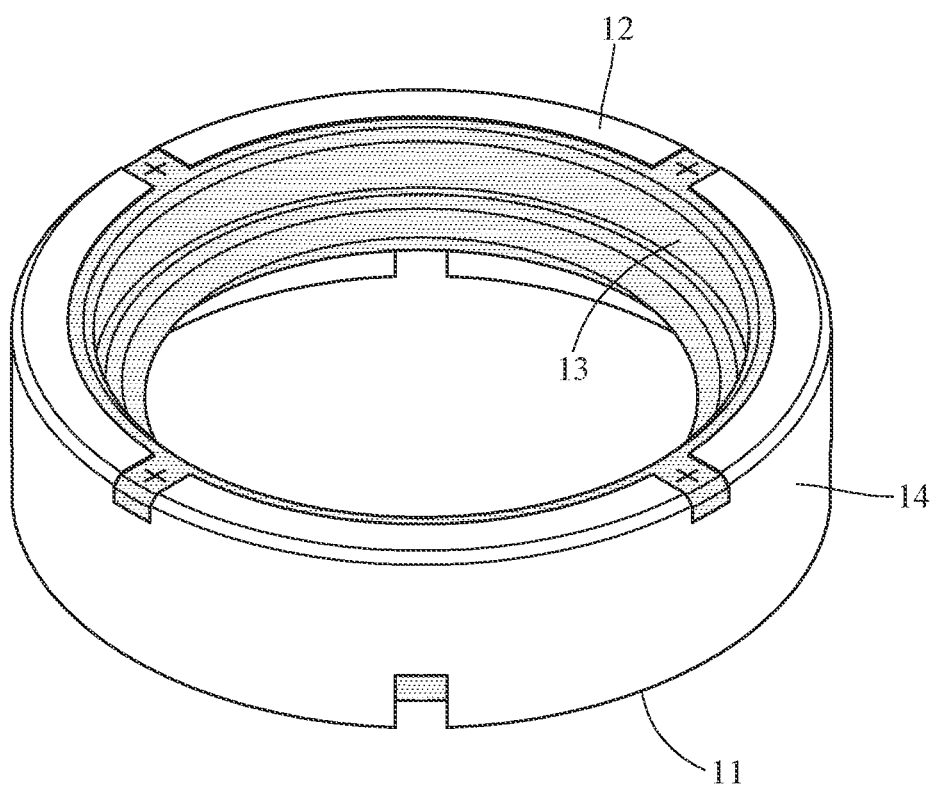
FIG. 1 is a perspective view of an annular optical component according to the 1st embodiment of the present disclosure.

An annular optical component includes an inner surface, an outer surface, an object-side surface and an image-side surface. The outer surface is opposite to the inner surface, and the image-side surface is opposite to the object-side surface. The object-side surface faces toward an object side of the annular optical component, and the image-side surface faces toward an image side of the annular optical component. Both the object-side surface and image-side surface are connected to the outer surface and the inner surface. The inner surface includes a molded anti-reflective layer structure. The molded anti-reflective layer structure surrounds a central axis of the annular optical component, and the molded anti-reflective layer structure defines a central aperture. The outer surface includes a frame structure, and the frame structure surrounds at least a part of the molded anti-reflective layer structure. The molded anti-reflective layer structure is joined with the frame structure. A hardness of the frame structure is larger than a hardness of the molded anti-reflective layer structure. The annular optical component includes the frame structure having relatively high hardness and the molded anti-reflective layer structure having relatively low hardness. The molded anti-reflective layer structure has low reflectivity so as to reduce the reflection of stray light so as to allow the annular optical component to be applicable to mobile devices and intelligent image sensing or capturing devices. In some cases, the frame structure is made of metal material, the molded anti-reflective layer structure is made of resin material, and the molded anti-reflective layer structure is disposed on the frame structure by injection molding.

The molded anti-reflective layer structure can include a tapered portion adjacent to the central aperture, and the tapered portion can taper off along a direction from the outer surface toward the inner surface. Therefore, it is favorable for the molded anti-reflective layer structure of the inner surface to have even thickness so as to prevent overly large difference in thickness between two opposite sides of the molded anti-reflective layer structure. In some cases, one side of the tapered portion closer to the object-side surface tapers off toward the central aperture. In yet some cases, another side of the tapered portion closer to the image-side surface tapers off toward the central aperture.

When a diameter of the outer surface is φo, and a minimum diameter of the inner surface is φi, the following condition can be satisfied: $1.1<\varphi o/\varphi i<3.5$. Therefore, a proper ratio of the diameter of the outer surface to the minimum diameter of the inner surface is favorable for preventing overly thin molded anti-reflective layer structure due to molding problems.

The tapered portion of the molded anti-reflective layer structure can include an angled end. Therefore, it is favorable for the inner surface of the annular optical component to be a non-smooth surface so as to prevent reflection of light.

When an angle of the angled end of the tapered portion is θ, the following condition can be satisfied: 46 degrees<θ<136 degrees. Therefore, it is favorable for the angled end having a proper angle. In detail, when the angle of the angled end is overly small, some slits existed at the periphery of the central aperture of the annular optical component result in light leakage, and thus degrade the image quality. When the angle of the angled end is overly large, the inner surface is overly smooth, which is unfavorable for preventing the reflection of stray light.

When a displacement in parallel with the central axis of the annular optical component between the angled end and the object-side surface is h, and a thickness of the annular optical component is d, the following condition can be satisfied: $0.1<h/d<0.9$. Therefore, it is favorable for preventing the tapered portion from overly slanted to either the object-side surface or the image-side surface so as to reduce molding flash on the molded anti-reflective layer structure, thereby improving manufacturing quality of the tapered portion. Preferably, the following condition can also be satisfied: $0.3<h/d<0.7$. Therefore, it is favorable for the plastic material to flow in a steady state during injection molding process so as to obtain the tapered portion with even thickness.

The frame structure can include at least one notch structure, and the notch structure extends from the object-side surface toward the image-side surface; that is, the notch structure extends from the object-side surface toward the image-side surface, or the notch structure extends from the image-side surface toward the object-side surface. The notch structure provides a better attachment between the molded anti-reflective layer structure and the frame structure; furthermore, the notch structure also provides a better sealing tightness between the frame structure and an injection mold for manufacturing the molded anti-reflective layer structure so as to prevent movement (slide or rotation) of the frame structure with respect to the injection mold. In some cases, the notch structure is located on one side of the frame structure facing toward the object side. In still some cases, the notch structure is located on one side of the frame structure facing toward the image side.

The molded anti-reflective layer structure can be made of black and opaque resin material. The molded anti-reflective layer structure can include at least one resin gate trace, and the resin gate trace corresponds to the at least one notch structure. Therefore, the notch structure is used as a channel for plastic resin flow for molding the molded anti-reflective layer structure, such that it is favorable for increasing molding design flexibility, thereby increasing the design flexibility of resin injection gate.

The frame structure can have uneven thickness. The frame structure can taper off along either a direction from the image-side surface toward the object-side surface or a direction from the object-side surface toward the image-side surface. Therefore, it is favorable for ensuring a good fluidity of the plastic resin during injection molding process, and thus improving the appearance quality thereof.

When the thickness of the annular optical component is d, and the minimum diameter of the inner surface is φi, the following condition can be satisfied: 0.15<d/φi<0.8. Therefore, it is favorable for maintaining a proper ratio of the thickness of the annular optical component to the diameter of the central aperture. If the ratio is overly small, the overly thin frame structure may be easily distorted and deformed. If the ratio is overly large, the thickness distribution of the molded anti-reflective layer structure is uneven.

The molded anti-reflective layer structure can include glass fiber. Therefore, the molded anti-reflective layer structure is manufactured in a more accurate size and have higher mechanical strength, so that the molded anti-reflective layer structure can be processed to obtain an assembling structure.

The central aperture of the annular optical component can be non-circular. Therefore, it is favorable for the annular optical component to block unwanted light.

When the central aperture of the annular optical component is non-circular, the central aperture can have at least two arc sides. Therefore, it is favorable for effectively diverging reflected light so as to further reduce the intensity of unwanted reflected light.

When the central aperture of the annular optical component is non-circular, the central aperture can have at least two straight sides. Therefore, it is favorable for testing the manufacturing quality of the central aperture so as to increase quality control efficiency.

The molded anti-reflective layer structure can include a molded surface structure. The molded surface structure can be formed by additional patterns on the injection mold. Therefore, it is favorable for reducing the surface reflectivity of the molded anti-reflective layer structure so as to further reduce unwanted light reflection, and this allows the annular optical component to be applicable to environments having higher intensity of light or environments having lower intensity of light such as dark night and darkroom. In some cases, the molded surface structure includes a plurality of straight protrusions, which is favorable for effectively reducing surface reflection and thus allows the annular optical component to be applicable to various photographing environments without problems caused by reflected light, thereby improving the image quality. In still some cases, the molded surface structure includes a plurality of annular protrusions, which is favorable for an easier treatment to form patterns on the surface of the injection mold, thereby improving the processing efficiency on the injection mold and simplifying the manufacturing process.

According to the present disclosure, a camera lens module includes the aforementioned annular optical component and an optical lens assembly. The annular optical component is disposed in the optical lens assembly. In some embodiments, the camera lens module can further include a barrel member, a holding member or a combination thereof. When the annular optical component is disposed in the optical lens assembly, the object-side surface of the annular optical component faces toward an object side of the camera lens module, and the image-side surface of the annular optical component faces toward an image side of the camera lens module.

According to the present disclosure, the molded anti-reflective layer structure can include an axial assembling structure, and the annular optical component can be disposed in the optical lens assembly by the axial assembling structure. The optical lens assembly includes a lens element adjacent to the annular optical component, and the axial assembling structure is configured to align the central axis of the annular optical component with a center of the lens element. Therefore, it is favorable for improving the coaxiality of lens elements of the optical lens assembly so as to compensate unavoidable tolerances in the assembling process, thereby improving the image quality.

Among all parts of the molded anti-reflective layer structure, there can be only the axial assembling structure in contact with the lens element of the optical lens assembly adjacent to the annular optical component. In other words, except the axial assembling structure, other parts of the molded anti-reflective layer structure are not in contact with the aforementioned lens element. Therefore, it is favorable for reducing the damage risk of the molded anti-reflective layer structure by using the frame structure with relatively high mechanical strength to bear most of the fastening force when assembling the camera lens module.

The molded anti-reflective layer structure can be not in contact with the lens element of the optical lens assembly adjacent to the annular optical component. In other words, the aforementioned lens element is in contact with the frame structure. Therefore, it is favorable for reducing the possibility of the molded anti-reflective layer structure experiencing external stresses, thereby ensuring the shape consistency of the molded surface structure of the molded anti-reflective layer structure between before and after assembling.

According to the present disclosure, the molded anti-reflective layer structure is made of, for example, resin material such as polyamide (PA), polyethylene (PE), polyvinyl chloride polymer (PVC), polystyrene (PS), polypropylene (PP) or acrylonitrile butadiene styrene (ABS) copolymer; in addition, the molded anti-reflective layer structure may be made of resin material including glass fiber or chemical fiber. The frame structure is made of, for example, metal material such as copper, aluminum, zinc, stainless steel or alloys thereof.

According to the present disclosure, the hardness of the frame structure and the hardness of the molded anti-reflective layer structure can refer to scratch hardness, indentation hardness or rebound hardness.

According to the present disclosure, the aforementioned features and conditions can be utilized in numerous combinations so as to achieve corresponding effects.

According to the above description of the present disclosure, the following specific embodiments are provided for further explanation.

1st Embodiment

Figure 2:
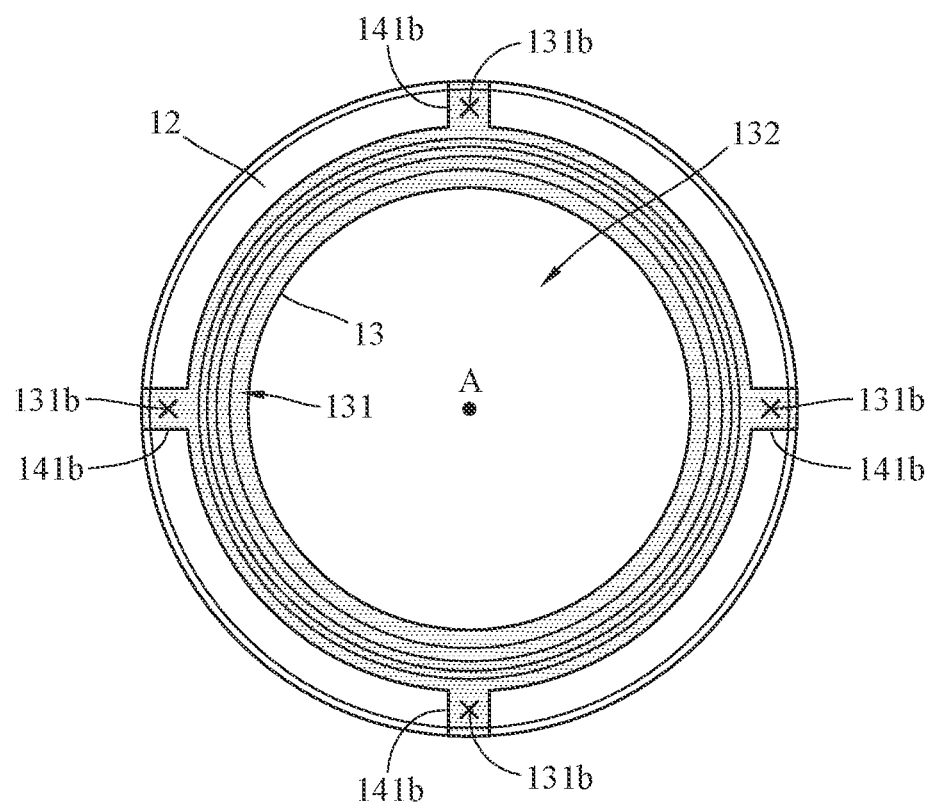
FIG. 2 is a top view of the annular optical component in FIG. 1.
Figure 3:
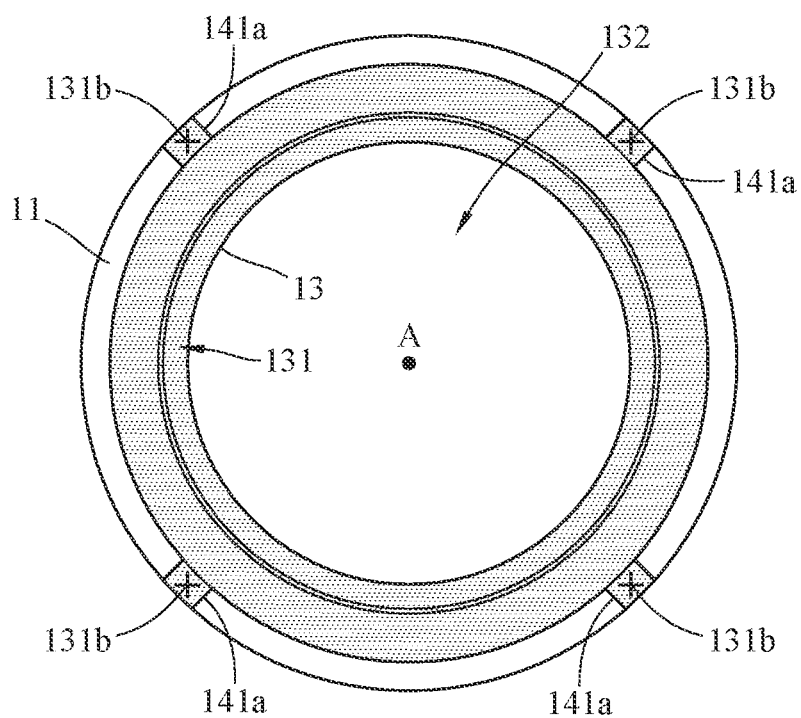
FIG. 3 is a bottom view of the annular optical component in FIG. 1.
Figure 4:
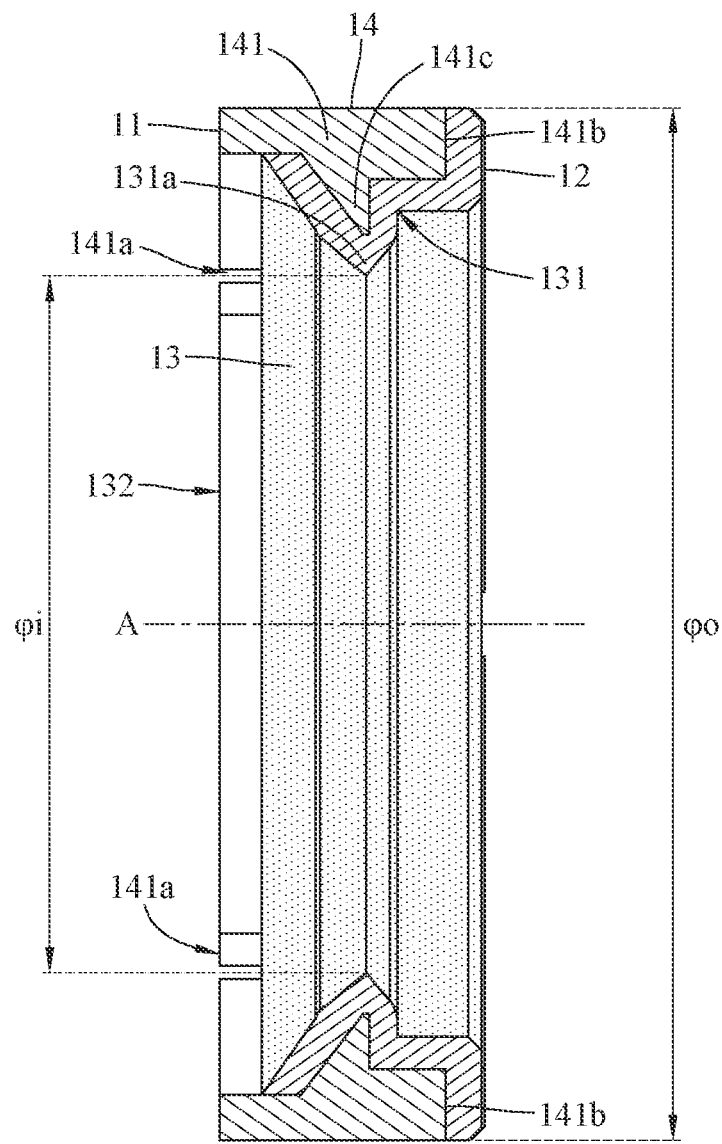
FIG. 4 is a side cross-sectional view of the annular optical component in FIG. 1.
Figure 4:
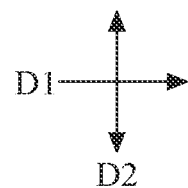

FIG. 1 is a perspective view of an annular optical component according to the 1st embodiment of the present disclosure. FIG. 2 is a top view of the annular optical component in FIG. 1. FIG. 3 is a bottom view of the annular optical component in FIG. 1. FIG. 4 is a side cross-sectional view of the annular optical component in FIG. 1. In this embodiment, an annular optical component 1 includes an object-side surface 11, an image-side surface 12, an inner surface 13 and an outer surface 14.

The object-side surface 11 faces toward an object side of the annular optical component 1. The image-side surface 12 faces toward an image side of the annular optical component 1, and the image-side surface 12 is opposite to the object-side surface 11. Both the object-side surface 11 and the image-side surface 12 are connected to the inner surface 13 and the outer surface 14.

The inner surface 13 includes a molded anti-reflective layer structure 131, and the molded anti-reflective layer structure 131 includes a tapered portion 131a and a plurality of resin gate traces 131b. The molded anti-reflective layer structure 131 surrounds a central axis A of the annular optical component 1, and the molded anti-reflective layer structure 131 defines a central aperture 132. The tapered portion 131a is adjacent to the central aperture 132 and includes an angled end 1311.

The outer surface 14 is opposite to the inner surface 13. The outer surface 14 includes a frame structure 141. The molded anti-reflective layer structure 131 is joined with the frame structure 141. The frame structure 141 surrounds a part of the molded anti-reflective layer structure 131. A hardness of the frame structure 141 is larger than a hardness of the molded anti-reflective layer structure 131. In this embodiment, the molded anti-reflective layer structure 131 is made of resin material and includes glass fiber, and the frame structure 141 is made of metal material.

The frame structure 141 includes a plurality of notch structures 141a on one side thereof facing toward the object side and a plurality of notch structures 141b on another side thereof facing toward the image side. All the notch structures 141a and 141b extend from the image-side surface 12 toward the object-side surface 11. The resin gate traces 131b of the molded anti-reflective layer structure 131 respectively correspond to the notch structures 141a and 141b.

The frame structure 141 has uneven thickness, and the frame structure 141 tapers off along a direction D1 from the object-side surface 11 toward the image-side surface 12. The frame structure 141 further includes a frame tapered portion 141c corresponding to the tapered portion 131a of the molded anti-reflective layer structure 131. Furthermore, both of the frame tapered portion 141c of the frame structure 141 and the tapered portion 131a of the molded anti-reflective layer structure 131 taper off along a direction D2 from the outer surface 14 toward the inner surface 13. In this embodiment, the tapered portion 131a has a first side 1312 closer to the object-side surface 11 and a second side 1313 closer to the image-side surface 12, and the tapered portion 131a tapers off from both the first side 1312 and the second side 1313 toward the central aperture 132.

When a diameter of the outer surface 14 is φo, and a minimum diameter of the inner surface 13 is φi, the following condition is satisfied: φo/φi=1.48.

Figure 5:
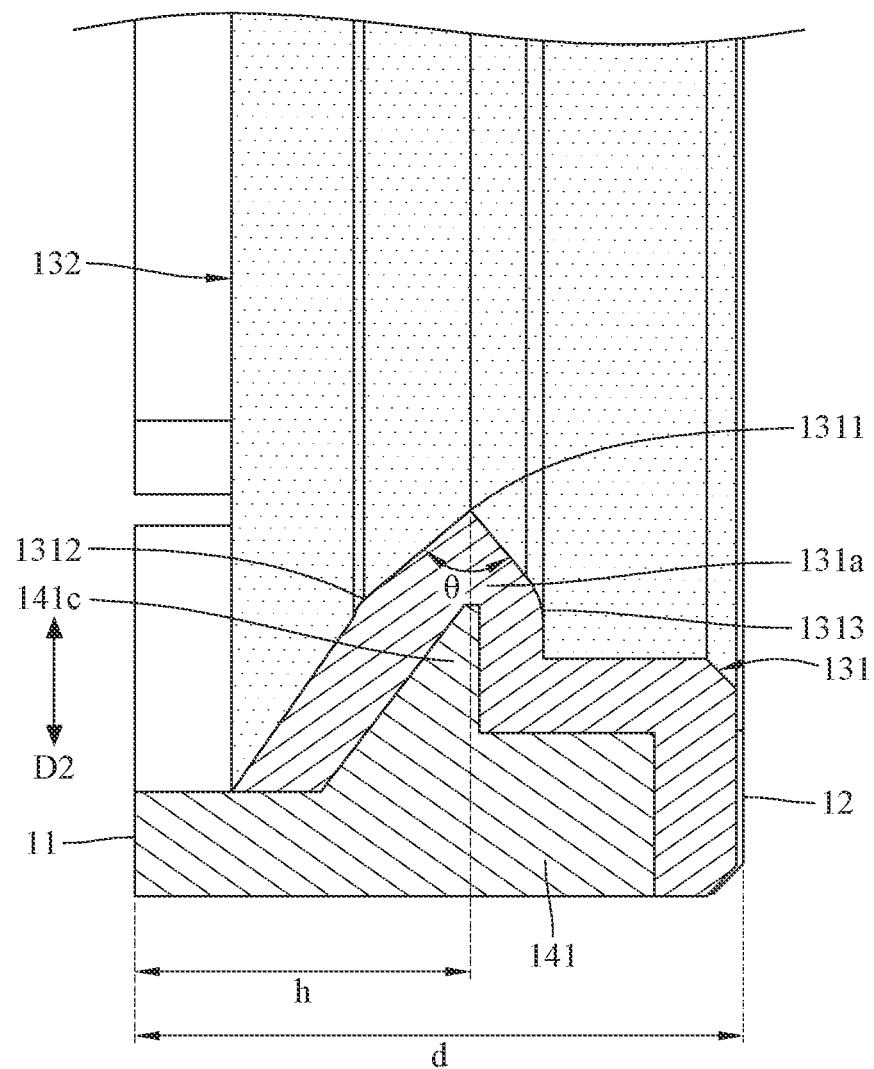
FIG. 5 is a partial and enlarged view of the annular optical component in FIG. 4.

FIG. 5 is a partial and enlarged view of the annular optical component in FIG. 4. When an angle of the angled end 1311 of the tapered portion 131a is θ, the following condition is satisfied: θ=90 degrees (deg.).

When a displacement in parallel with the central axis A of the annular optical component 1 between the angled end 1311 and the object-side surface 11 is h, and a thickness of the annular optical component 1 is d, the following condition is satisfied: h/d=0.55.

When the thickness of the annular optical component 1 is d, and the minimum diameter of the inner surface 13 is φi, the following condition is satisfied: d/φi=0.38.

2nd Embodiment

Figure 6:
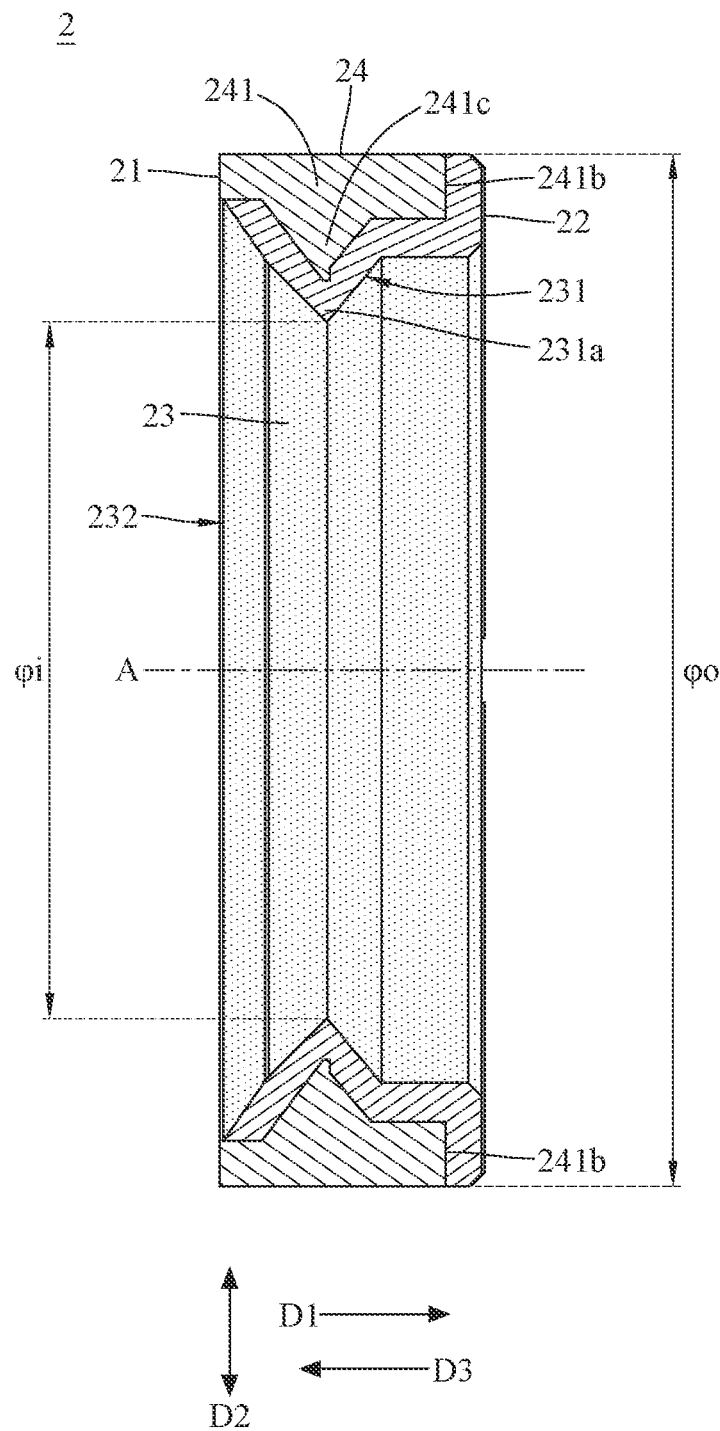
FIG. 6 is a side cross-sectional view of an annular optical component according to the 2nd embodiment of the present disclosure.
Figure 7:
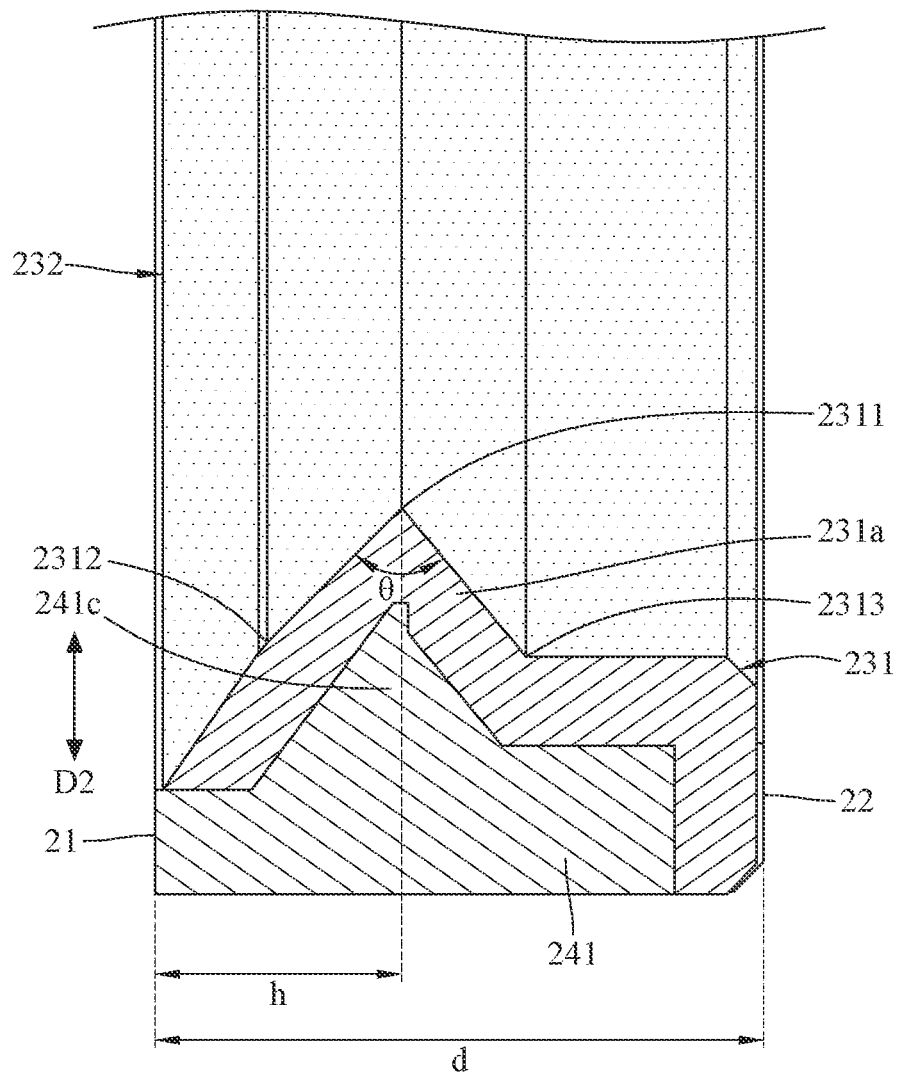
FIG. 7 is a partial and enlarged view of the annular optical component in FIG. 6.

FIG. 6 is a side cross-sectional view of an annular optical component according to the 2nd embodiment of the present disclosure. FIG. 7 is a partial and enlarged view of the annular optical component in FIG. 6. In this embodiment, an annular optical component 2 includes an object-side surface 21, an image-side surface 22, an inner surface 23 and an outer surface 24.

The object-side surface 21 faces toward an object side of the annular optical component 2. The image-side surface 22 faces toward an image side of the annular optical component 2, and the image-side surface 22 is opposite to the object-side surface 21. Both the object-side surface 21 and the image-side surface 22 are connected to the inner surface 23 and the outer surface 24.

The inner surface 23 includes a molded anti-reflective layer structure 231, and the molded anti-reflective layer structure 231 includes a tapered portion 231a and a plurality of resin gate traces (its reference numeral is omitted). The molded anti-reflective layer structure 231 surrounds a central axis A of the annular optical component 2, and the molded anti-reflective layer structure 231 defines a central aperture 232. The tapered portion 231a is adjacent to the central aperture 232 and includes an angled end 2311.

The outer surface 24 is opposite to the inner surface 23. The outer surface 24 includes a frame structure 241. The molded anti-reflective layer structure 231 is joined with the frame structure 241. The frame structure 241 surrounds a part of the molded anti-reflective layer structure 231. A hardness of the frame structure 241 is larger than a hardness of the molded anti-reflective layer structure 231. In this embodiment, the molded anti-reflective layer structure 231 is made of resin material and includes glass fiber, and the frame structure 241 is made of metal material.

The frame structure 241 includes a plurality of notch structures 241b on one side thereof facing toward the image side. The notch structures 241b extend from the image-side surface 22 toward the object-side surface 21. The resin gate traces of the molded anti-reflective layer structure 231 respectively correspond to the notch structures 241b.

The frame structure 241 has uneven thickness, and the frame structure 241 tapers off along a direction D1 from the object-side surface 21 toward the image-side surface 22 and a direction D3 from the image-side surface 22 toward the object-side surface 21. The frame structure 241 further includes a frame tapered portion 241c corresponding to the tapered portion 231a of the molded anti-reflective layer structure 231. Furthermore, both of the frame tapered portion 241c of the frame structure 241 and the tapered portion 231a of the molded anti-reflective layer structure 231 taper off along a direction D2 from the outer surface 24 toward the inner surface 23. In this embodiment, the tapered portion 231a has a first side 2312 closer to the object-side surface 21 and a second side 2313 closer to the image-side surface 22, and the tapered portion 231a tapers off from both the first side 2312 and the second side 2313 toward the central aperture 232.

In the 2nd embodiment, the definitions of these parameters shown in the following table are the same as those stated in the 1st embodiment with corresponding values for the 2nd embodiment, so an explanation in this regard will not be provided again.

| 2nd embodiment | | | |
| --- | --- | --- | --- |
| φo/φi | 1.48 | h/d | 0.40 |
| θ [deg.] | 85 | d/φi | 0.38 |

3rd Embodiment

Figure 8:
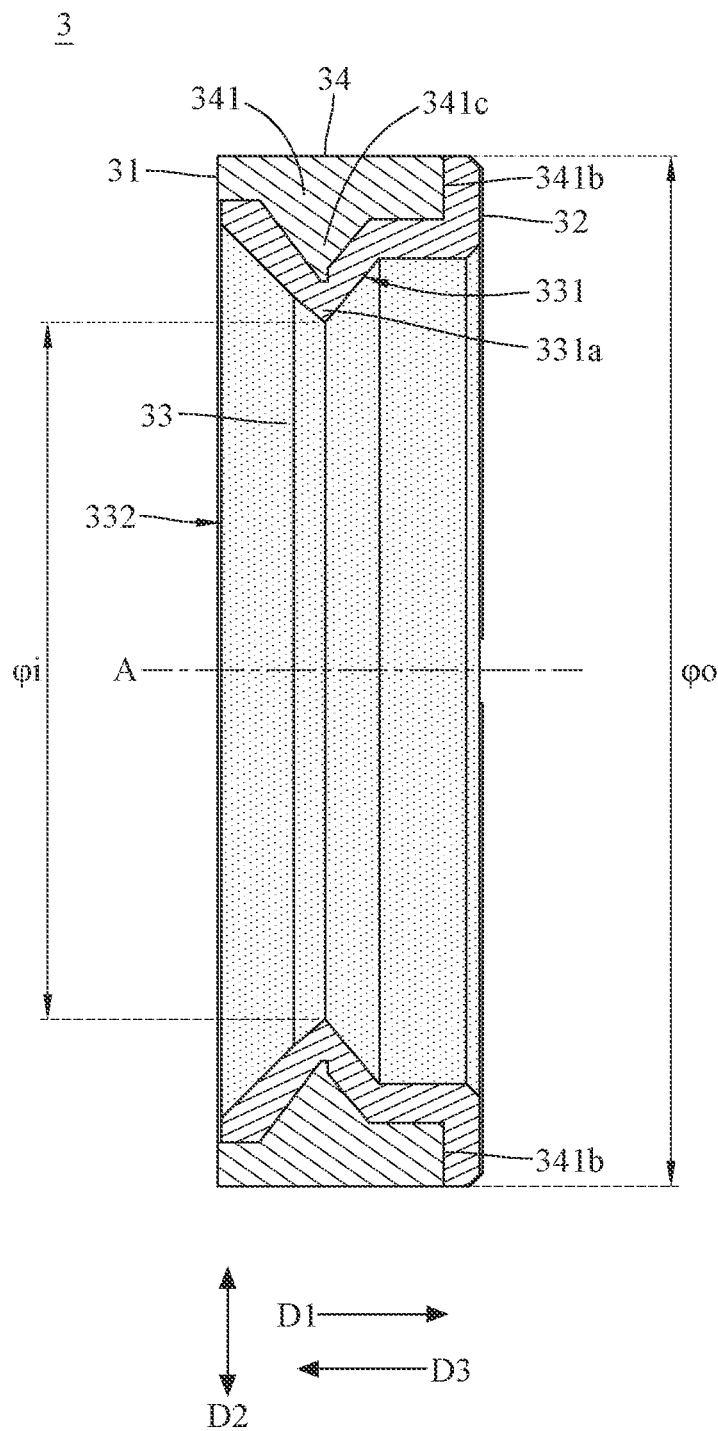
FIG. 8 is a side cross-sectional view of an annular optical component according to the 3rd embodiment of the present disclosure.
Figure 9:
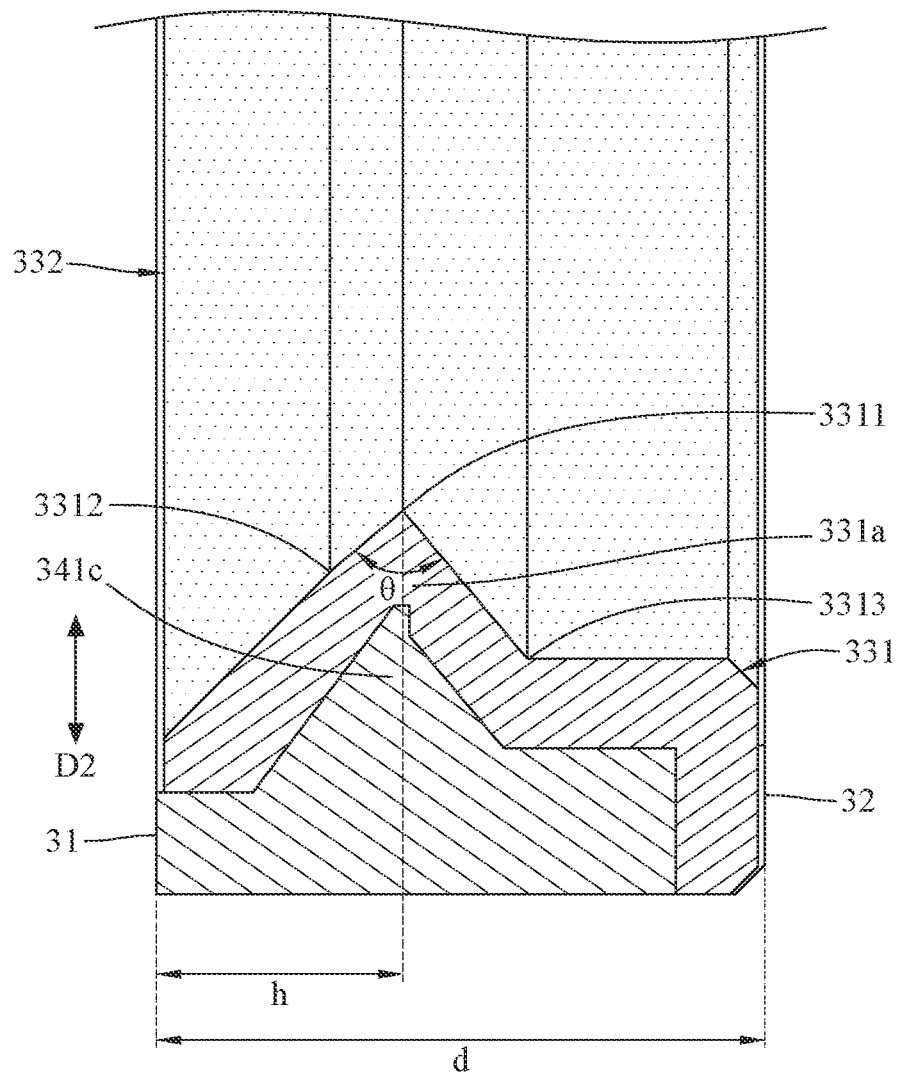
FIG. 9 is a partial and enlarged view of the annular optical component in FIG. 8.

FIG. 8 is a side cross-sectional view of an annular optical component according to the 3rd embodiment of the present disclosure. FIG. 9 is a partial and enlarged view of the annular optical component in FIG. 8. In this embodiment, an annular optical component 3 includes an object-side surface 31, an image-side surface 32, an inner surface 33 and an outer surface 34.

The object-side surface 31 faces toward an object side of the annular optical component 3. The image-side surface 32 faces toward an image side of the annular optical component 3, and the image-side surface 32 is opposite to the object-side surface 31. Both the object-side surface 31 and the image-side surface 32 are connected to the inner surface 33 and the outer surface 34.

The inner surface 33 includes a molded anti-reflective layer structure 331, and the molded anti-reflective layer structure 331 includes a tapered portion 331a and a plurality of resin gate traces (its reference numeral is omitted). The molded anti-reflective layer structure 331 surrounds a central axis A of the annular optical component 3, and the molded anti-reflective layer structure 331 defines a central aperture 332. The tapered portion 331a is adjacent to the central aperture 332 and includes an angled end 3311.

The outer surface 34 is opposite to the inner surface 33. The outer surface 34 includes a frame structure 341. The molded anti-reflective layer structure 331 is joined with the frame structure 341. The frame structure 341 surrounds a part of the molded anti-reflective layer structure 331. A hardness of the frame structure 341 is larger than a hardness of the molded anti-reflective layer structure 331. In this embodiment, the molded anti-reflective layer structure 331 is made of resin material and includes glass fiber, and the frame structure 341 is made of metal material.

The frame structure 341 includes a plurality of notch structures 341b on one side thereof facing toward the image side. The notch structures 341b extend from the image-side surface 32 toward the object-side surface 31. The resin gate traces of the molded anti-reflective layer structure 331 respectively correspond to the notch structures 341b.

The frame structure 341 has uneven thickness, and the frame structure 341 tapers off along a direction D1 from the object-side surface 31 toward the image-side surface 32 and a direction D3 from the image-side surface 32 toward the object-side surface 31. The frame structure 341 further includes a frame tapered portion 341c corresponding to the tapered portion 331a of the molded anti-reflective layer structure 331. Furthermore, both of the frame tapered portion 341c of the frame structure 341 and the tapered portion 331a of the molded anti-reflective layer structure 331 taper off along a direction D2 from the outer surface 34 toward the inner surface 33. In this embodiment, the tapered portion 331a has a first side 3312 closer to the object-side surface 31 and a second side 3313 closer to the image-side surface 32, and the tapered portion 331a tapers off from both the first side 3312 and the second side 3313 toward the central aperture 332.

In the 3rd embodiment, the definitions of these parameters shown in the following table are the same as those stated in the 1st embodiment with corresponding values for the 3rd embodiment, so an explanation in this regard will not be provided again.

| 3rd embodiment | | | |
|---|---|---|---|
| φo/φi | 1.48 | h/d | 0.40 |
| θ [deg.] | 90 | d/φi | 0.38 |

4th Embodiment

Figure 10:
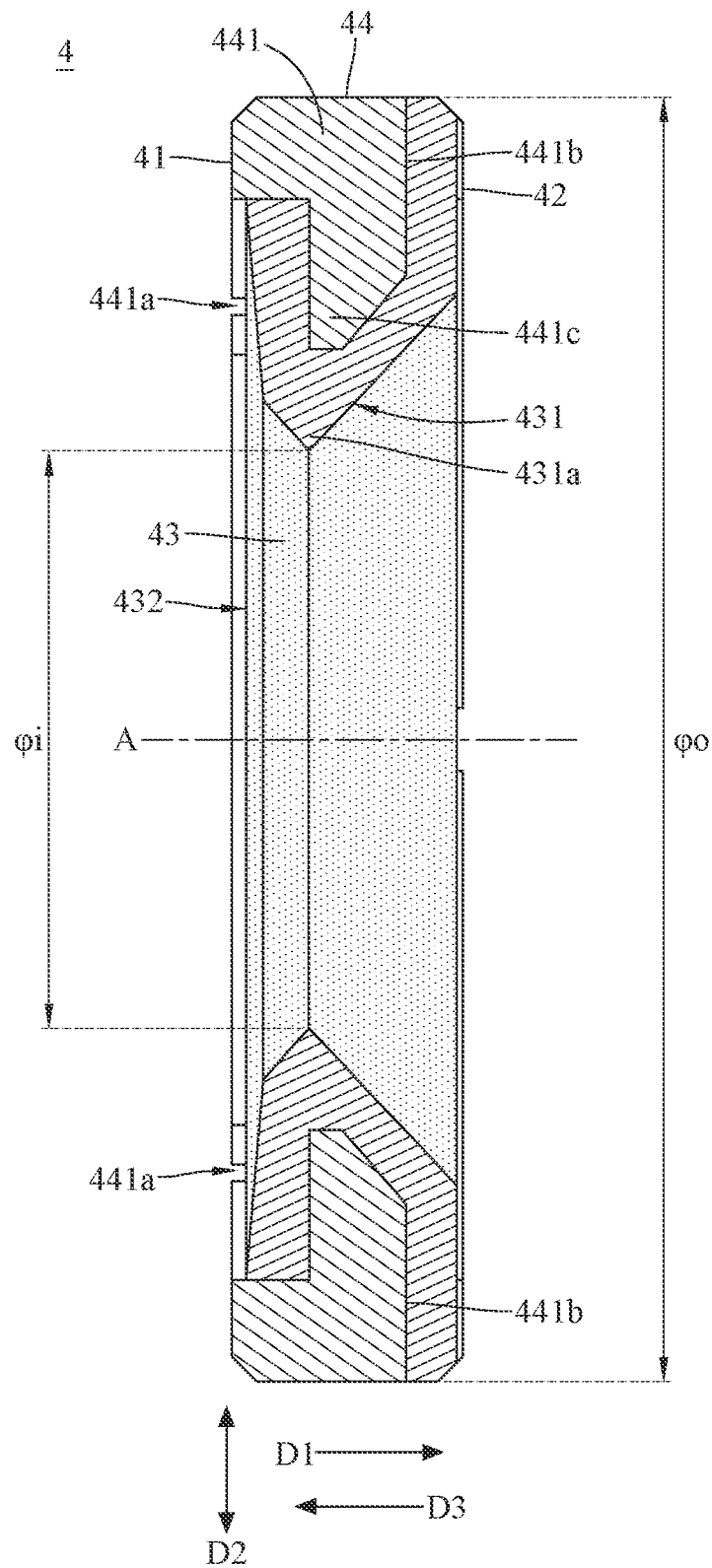
FIG. 10 is a side cross-sectional view of an annular optical component according to the 4th embodiment of the present disclosure.
Figure 11:
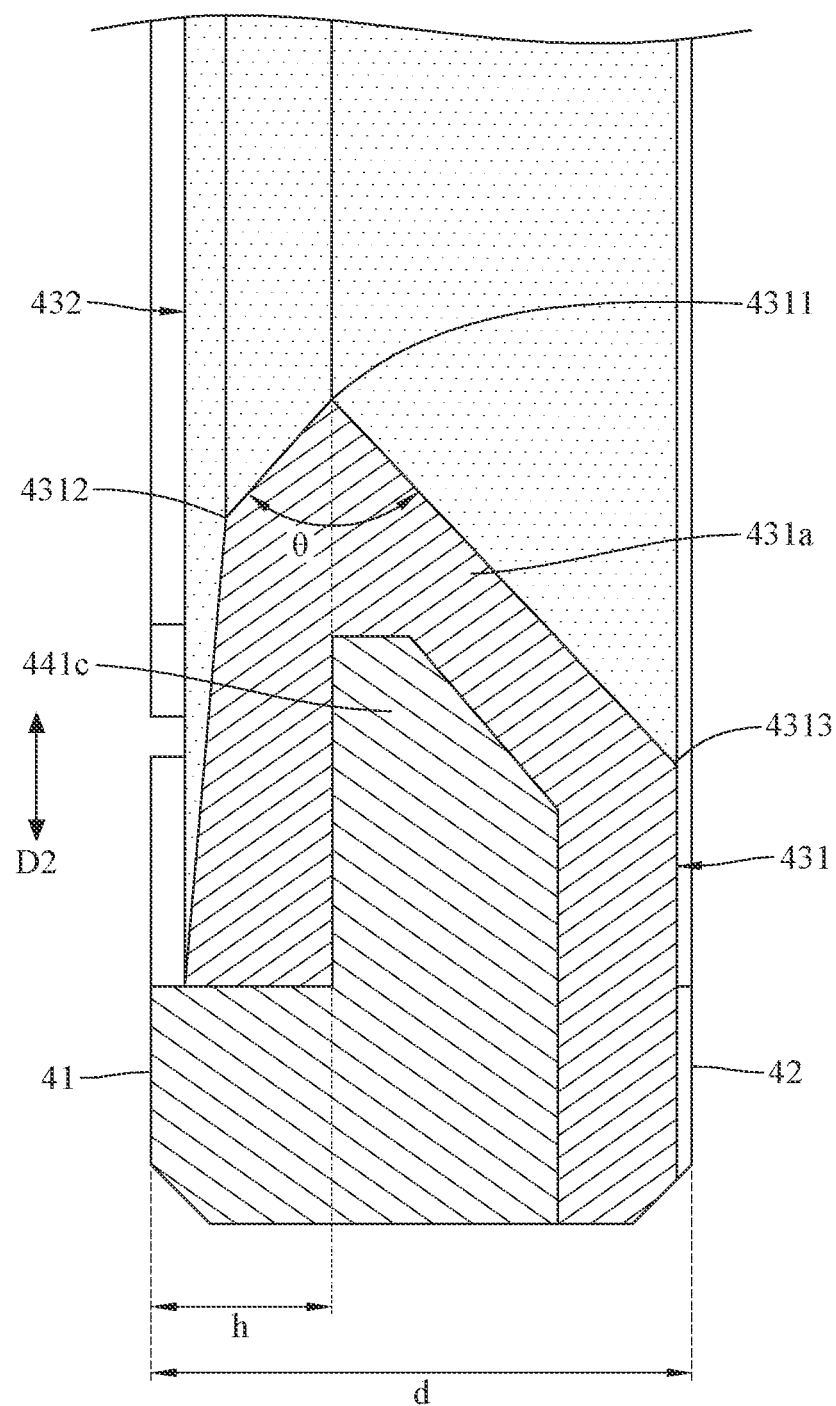
FIG. 11 is a partial and enlarged view of the annular optical component in FIG. 10.

FIG. 10 is a side cross-sectional view of an annular optical component according to the 4th embodiment of the present disclosure. FIG. 11 is a partial and enlarged view of the annular optical component in FIG. 10. In this embodiment, an annular optical component 4 includes an object-side surface 41, an image-side surface 42, an inner surface 43 and an outer surface 44.

The object-side surface 41 faces toward an object side of the annular optical component 4. The image-side surface 42 faces toward an image side of the annular optical component 4, and the image-side surface 42 is opposite to the object-side surface 41. Both the object-side surface 41 and the image-side surface 42 are connected to the inner surface 43 and the outer surface 44.

The inner surface 43 includes a molded anti-reflective layer structure 431, and the molded anti-reflective layer structure 431 includes a tapered portion 431a and a plurality of resin gate traces (its reference numeral is omitted). The molded anti-reflective layer structure 431 surrounds a central axis A of the annular optical component 4, and the molded anti-reflective layer structure 431 defines a central aperture 432. The tapered portion 431a is adjacent to the central aperture 432 and includes an angled end 4311.

The outer surface 44 is opposite to the inner surface 43. The outer surface 44 includes a frame structure 441. The molded anti-reflective layer structure 431 is joined with the frame structure 441. The frame structure 441 surrounds a part of the molded anti-reflective layer structure 431. A hardness of the frame structure 441 is larger than a hardness of the molded anti-reflective layer structure 431. In this embodiment, the molded anti-reflective layer structure 431 is made of resin material and includes glass fiber, and the frame structure 441 is made of metal material.

The frame structure 441 includes a plurality of notch structures 441a on one side thereof facing toward the object side and a plurality of notch structures 441b on another side thereof facing toward the image side. All the notch structures 441a and 441b extend from the image-side surface 42 toward the object-side surface 41. The resin gate traces of the molded anti-reflective layer structure 431 respectively correspond to the notch structures 441a and 441b.

The frame structure 441 has uneven thickness, and the frame structure 441 tapers off along a direction D3 from the image-side surface 42 toward the object-side surface 41. The frame structure 441 further includes a frame tapered portion 441c corresponding to the tapered portion 431a of the molded anti-reflective layer structure 431. Furthermore, both of the frame tapered portion 441c of the frame structure 441 and the tapered portion 431a of the molded anti-reflective layer structure 431 taper off along a direction D2 from the outer surface 44 toward the inner surface 43. In this embodiment, the tapered portion 431a has a first side 4312 closer to the object-side surface 41 and a second side 4313 closer to the image-side surface 42, and the tapered portion 431a tapers off from both the first side 4312 and the second side 4313 toward the central aperture 432.

In the 4th embodiment, the definitions of these parameters shown in the following table are the same as those stated in the 1st embodiment with corresponding values for the 4th embodiment, so an explanation in this regard will not be provided again.

| 4th embodiment | | | |
|---|---|---|---|
| φo/φi | 2.22 | h/d | 0.34 |
| θ [deg.] | 85 | d/φi | 0.39 |

5th Embodiment

Figure 12:
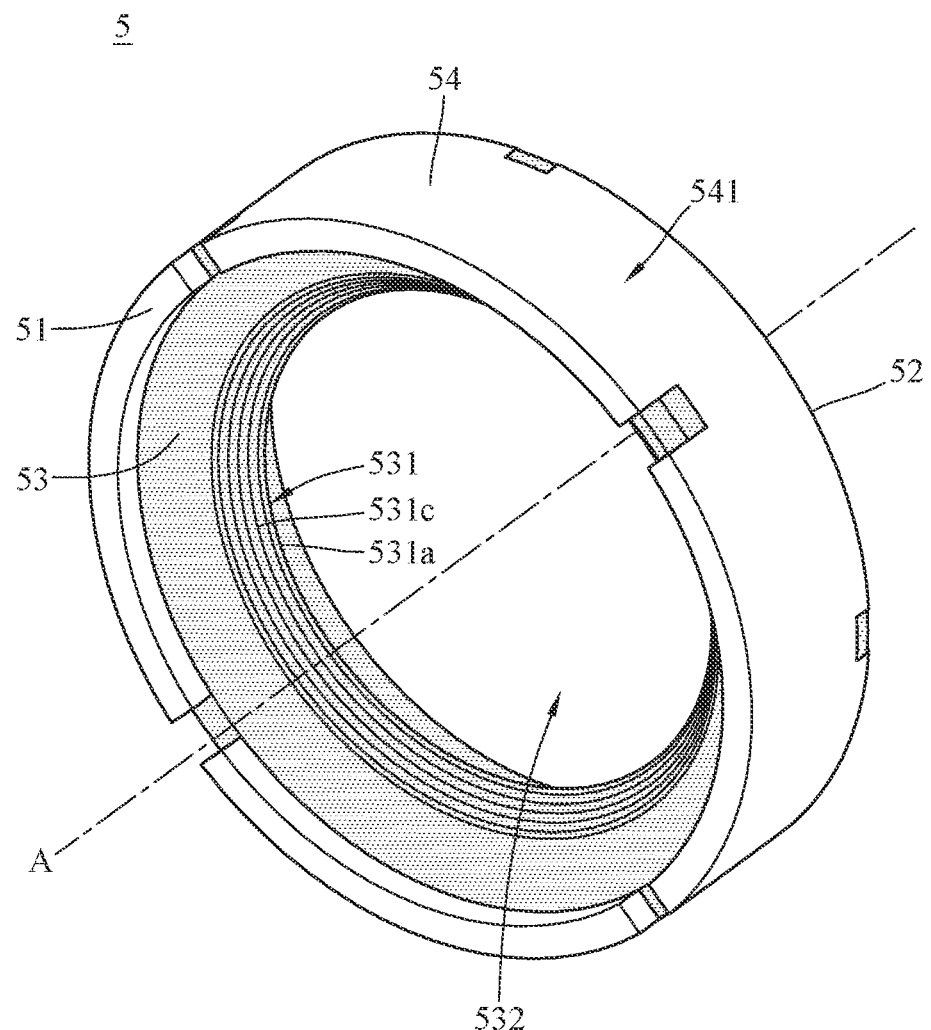
FIG. 12 a perspective view of an annular optical component according to the 5th embodiment of the present disclosure.
Figure 13:
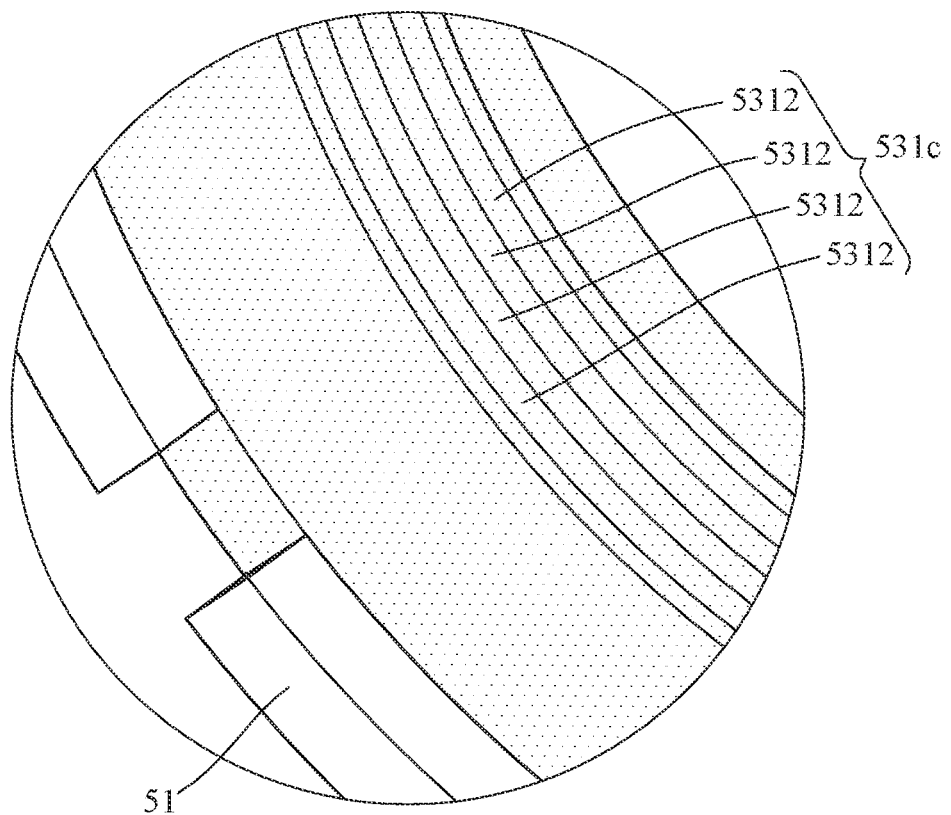
FIG. 13 is a partial and enlarged view of the annular optical component in FIG. 12.

FIG. 12 a perspective view of an annular optical component according to the 5th embodiment of the present disclosure. FIG. 13 is a partial and enlarged view of the annular optical component in FIG. 12. In this embodiment, an annular optical component 5 includes an object-side surface 51, an image-side surface 52, an inner surface 53 and an outer surface 54.

The object-side surface 51 faces toward an object side of the annular optical component 5. The image-side surface 52 faces toward an image side of the annular optical component 5, and the image-side surface 52 is opposite to the object-side surface 51. Both the object-side surface 51 and the image-side surface 52 are connected to the inner surface 53 and the outer surface 54.

The inner surface 53 includes a molded anti-reflective layer structure 531, and the molded anti-reflective layer structure 531 includes a tapered portion 531a. The molded anti-reflective layer structure 531 surrounds a central axis A of the annular optical component 5, and the molded anti-reflective layer structure 531 defines a central aperture 532.

The outer surface 54 is opposite to the inner surface 53. The outer surface 54 includes a frame structure 541. The molded anti-reflective layer structure 531 is joined with the frame structure 541. The frame structure 541 surrounds a part of the molded anti-reflective layer structure 531. A hardness of the frame structure 541 is larger than a hardness of the molded anti-reflective layer structure 531. In this embodiment, the tapered portion 531a of the molded anti-reflective layer structure 531 is adjacent to the central aperture 532, and the molded anti-reflective layer structure 531 includes a molded surface structure 531c. The molded surface structure 531c includes a plurality of annular protrusions 5312, and a curvature radius of each of the annular protrusions 5312 is approximately 0.1 mm.

6th Embodiment

Figure 14:
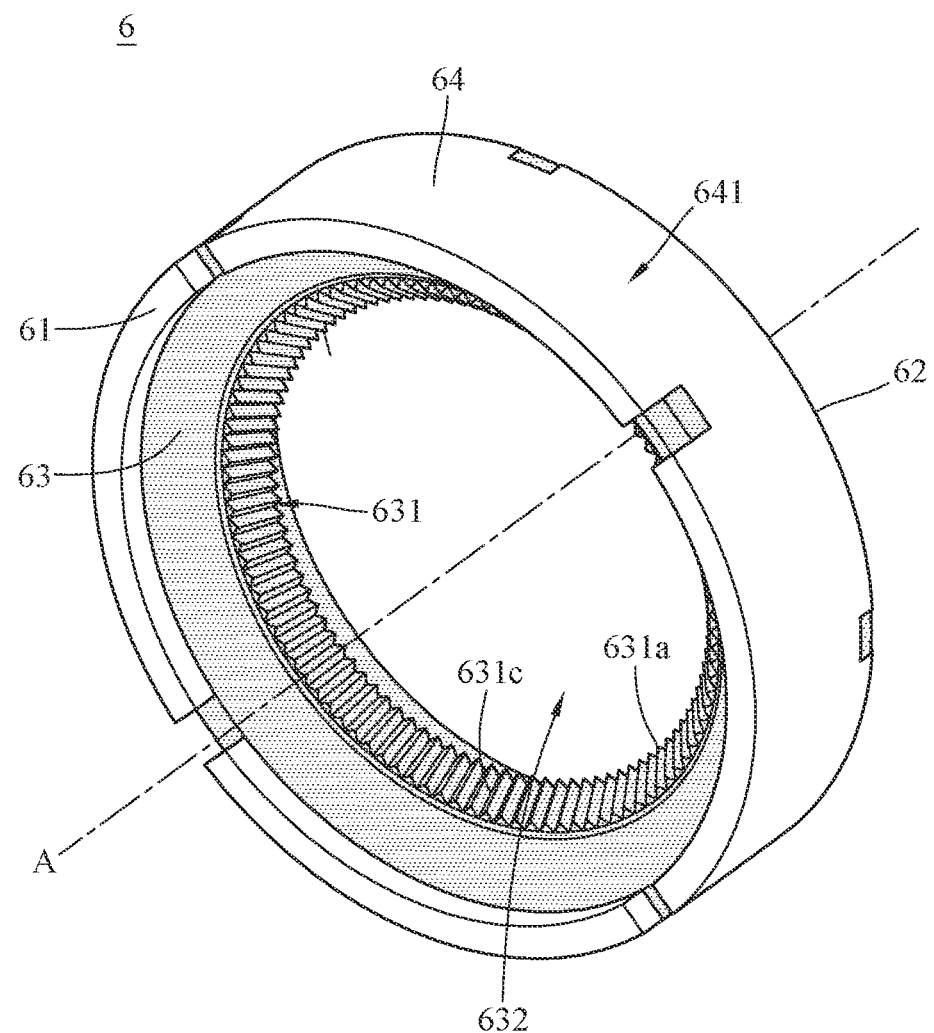
FIG. 14 a perspective view of an annular optical component according to the 6th embodiment of the present disclosure.
Figure 15:
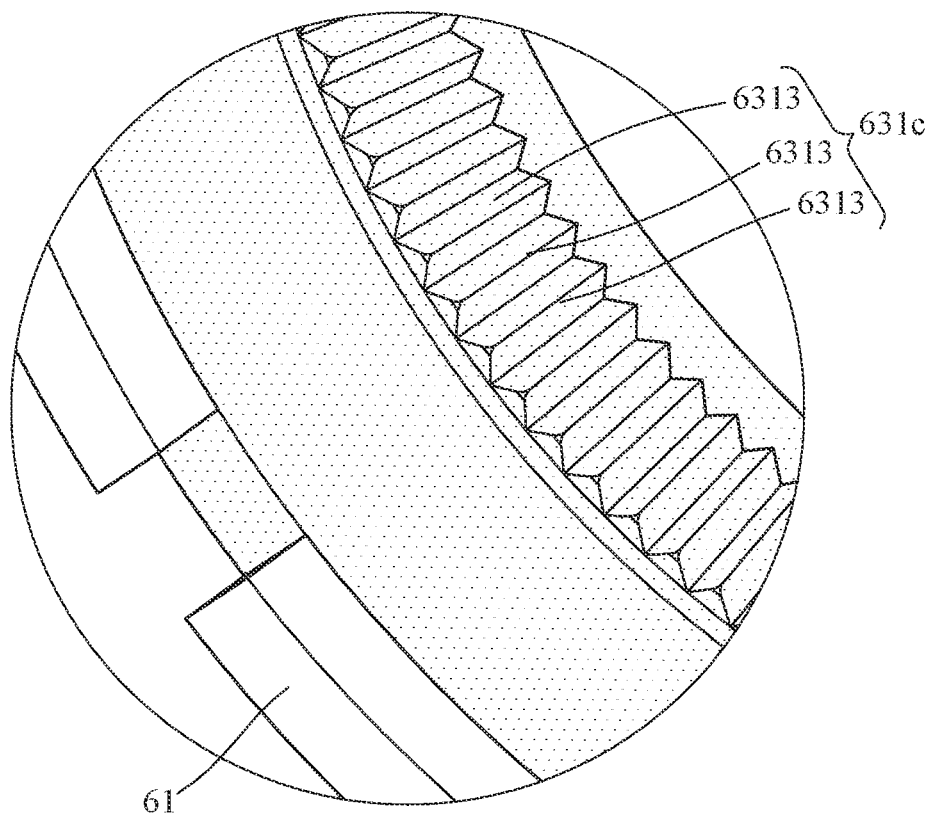
FIG. 15 is a partial and enlarged view of the annular optical component in FIG. 14.

FIG. 14 a perspective view of an annular optical component according to the 6th embodiment of the present disclosure. FIG. 15 is a partial and enlarged view of the annular optical component in FIG. 14. In this embodiment, an annular optical component 6 includes an object-side surface 61, an image-side surface 62, an inner surface 63 and an outer surface 64.

The object-side surface 61 faces toward an object side of the annular optical component 6. The image-side surface 62 faces toward an image side of the annular optical component 6, and the image-side surface 62 is opposite to the object-side surface 61. Both the object-side surface 61 and the image-side surface 62 are connected to the inner surface 63 and the outer surface 64.

The inner surface 63 includes a molded anti-reflective layer structure 631, and the molded anti-reflective layer structure 631 includes a tapered portion 631a. The molded anti-reflective layer structure 631 surrounds a central axis A of the annular optical component 6, and the molded anti-reflective layer structure 631 defines a central aperture 632.

The outer surface 64 is opposite to the inner surface 63. The outer surface 64 includes a frame structure 641. The molded anti-reflective layer structure 631 is joined with the frame structure 641. The frame structure 641 surrounds a part of the molded anti-reflective layer structure 631. A hardness of the frame structure 641 is larger than a hardness of the molded anti-reflective layer structure 631. In this embodiment, the tapered portion 631a of the molded anti-reflective layer structure 631 is adjacent to the central aperture 632, and the molded anti-reflective layer structure 631 includes a molded surface structure 631c. The molded surface structure 631c includes a plurality of straight protrusions 6313 arranged side by side.

7th Embodiment

Figure 16:
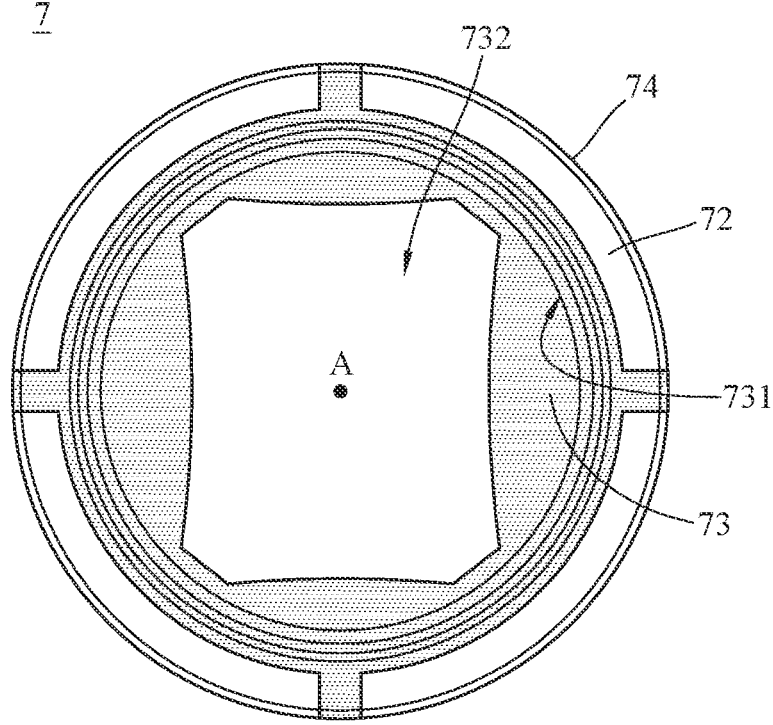
FIG. 16 is a top view of an annular optical component according to the 7th embodiment of the present disclosure.
Figure 17:
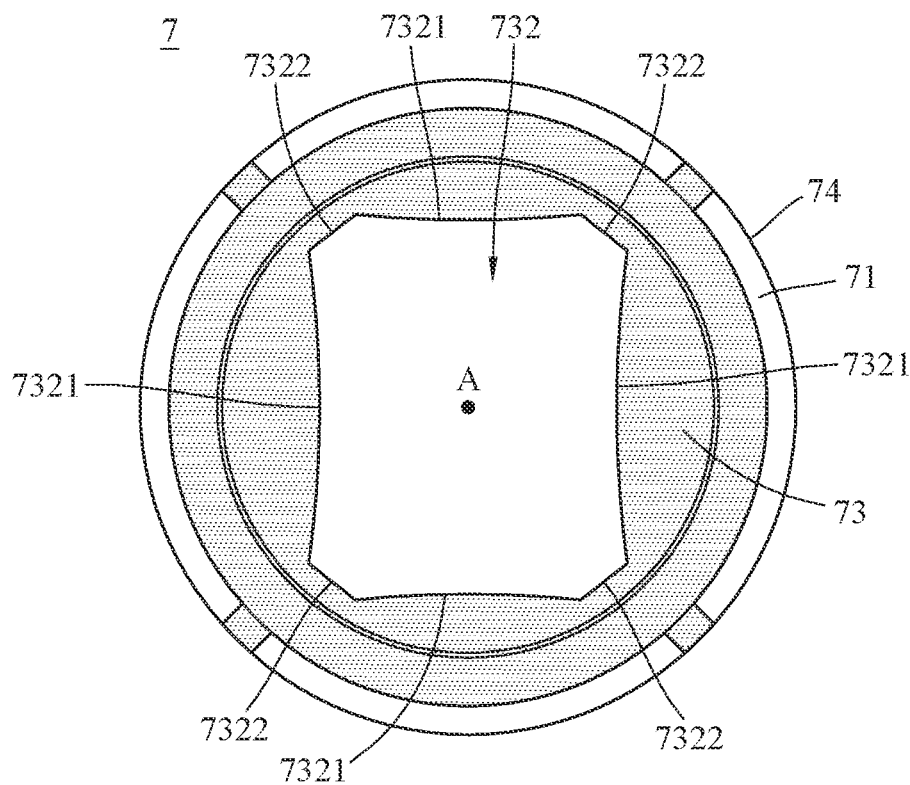
FIG. 17 is a bottom view of the annular optical component according to the 7th embodiment of the present disclosure.

FIG. 16 is a top view of an annular optical component according to the 7th embodiment of the present disclosure. FIG. 17 is a bottom view of the annular optical component according to the 7th embodiment of the present disclosure. In this embodiment, an annular optical component 7 includes an object-side surface 71, an image-side surface 72, an inner surface 73 and an outer surface 74.

The object-side surface 71 faces toward an object side of the annular optical component 7. The image-side surface 72 faces toward an image side of the annular optical component 7, and the image-side surface 72 is opposite to the object-side surface 71. Both the object-side surface 71 and the image-side surface 72 are connected to the inner surface 73 and the outer surface 74.

The inner surface 73 includes a molded anti-reflective layer structure 731. The molded anti-reflective layer structure 731 surrounds a central axis A of the annular optical component 7, and the molded anti-reflective layer structure 731 defines a central aperture 732. In this embodiment, the central aperture 732 is in a non-circular shape having four arc sides 7321 and four straight sides 7322.

8th Embodiment

Figure 18:
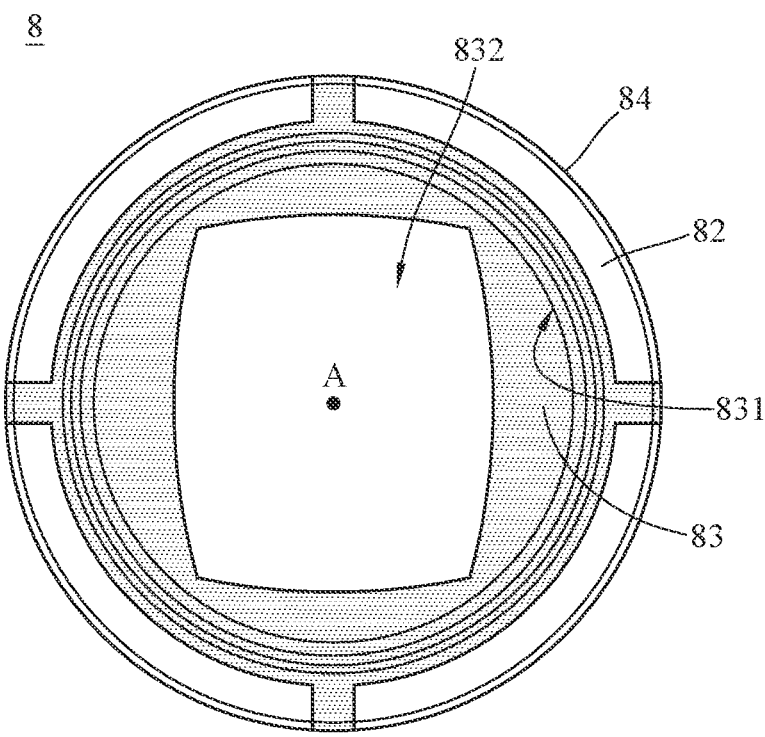
FIG. 18 is a partial and enlarged view of an annular optical component according to the 8th embodiment of the present disclosure.
Figure 19:
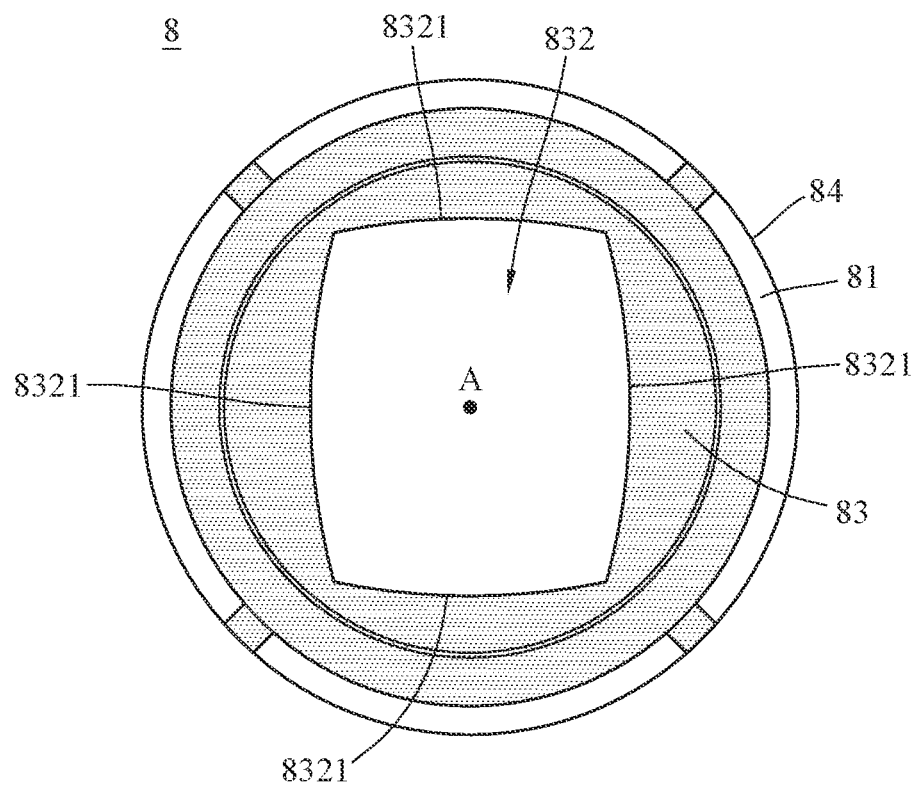
FIG. 19 is a bottom view of the annular optical component according to the 8th embodiment of the present disclosure.

FIG. 18 is a partial and enlarged view of an annular optical component according to the 8th embodiment of the present disclosure. FIG. 19 is a bottom view of the annular optical component according to the 8th embodiment of the present disclosure. In this embodiment, an annular optical component 8 includes an object-side surface 81, an image-side surface 82, an inner surface 83 and an outer surface 84.

The object-side surface 81 faces toward an object side of the annular optical component 8. The image-side surface 82 faces toward an image side of the annular optical component 8, and the image-side surface 82 is opposite to the object-side surface 81. Both the object-side surface 81 and the image-side surface 82 are connected to the inner surface 83 and the outer surface 84.

The inner surface 83 includes a molded anti-reflective layer structure 831. The molded anti-reflective layer structure 831 surrounds a central axis A of the annular optical component 8, and the molded anti-reflective layer structure 831 defines a central aperture 832. In this embodiment, the central aperture 832 is in a non-circular shape having four arc sides 8321.

9th Embodiment

Figure 20:
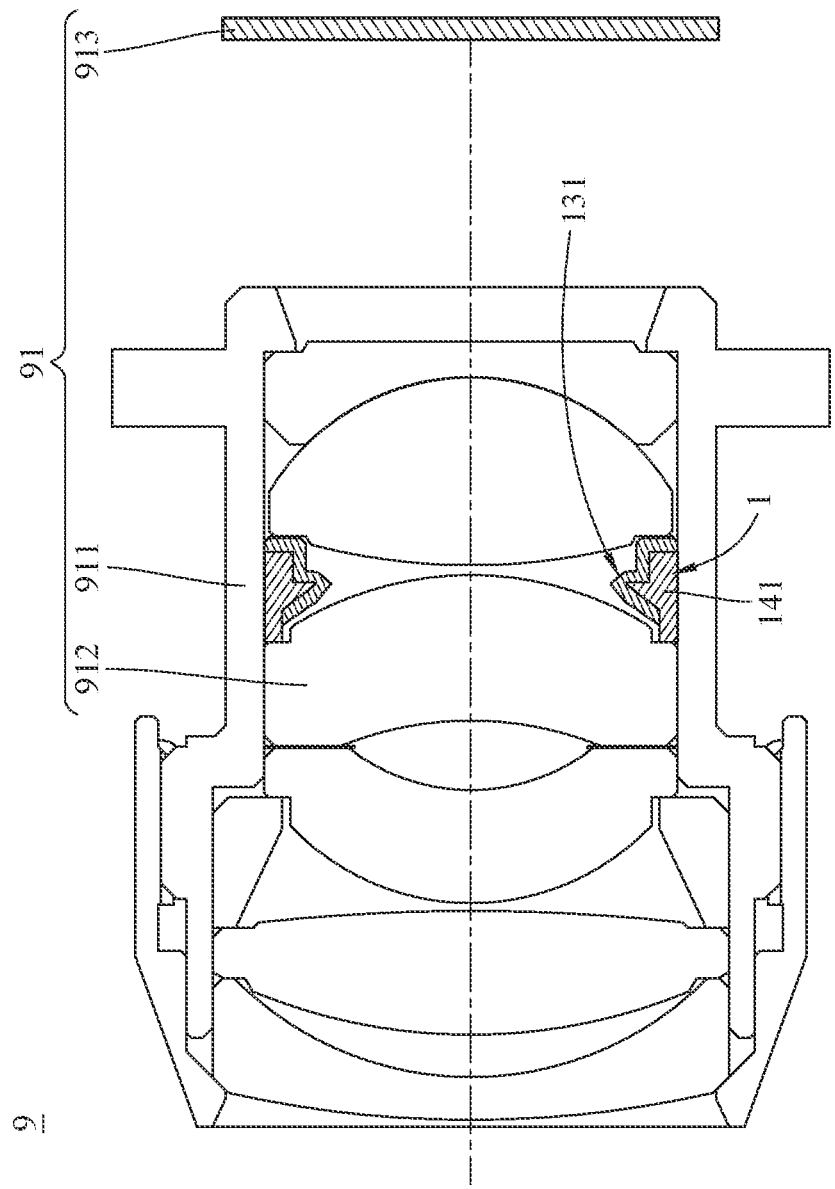
FIG. 20 is a schematic view of a camera lens module according to the 9th embodiment of the present disclosure.

FIG. 20 is a schematic view of a camera lens module according to the 9th embodiment of the present disclosure. In this embodiment, a camera lens module 9 includes the annular optical component 1 disclosed in the 1st embodiment and an optical lens assembly 91.

The optical lens assembly 91 includes a barrel 911, multiple lens elements 912 and an image sensor 913. The annular optical component 1 and the lens elements 912 are disposed in the barrel 911.

In this embodiment, the molded anti-reflective layer structure 131 is not in contact with the lens element 912 adjacent to the annular optical component 1. In other words, the frame structure 141 of the annular optical component 1 is in direct contact with the aforementioned lens element 912.

10th Embodiment

Figure 21:
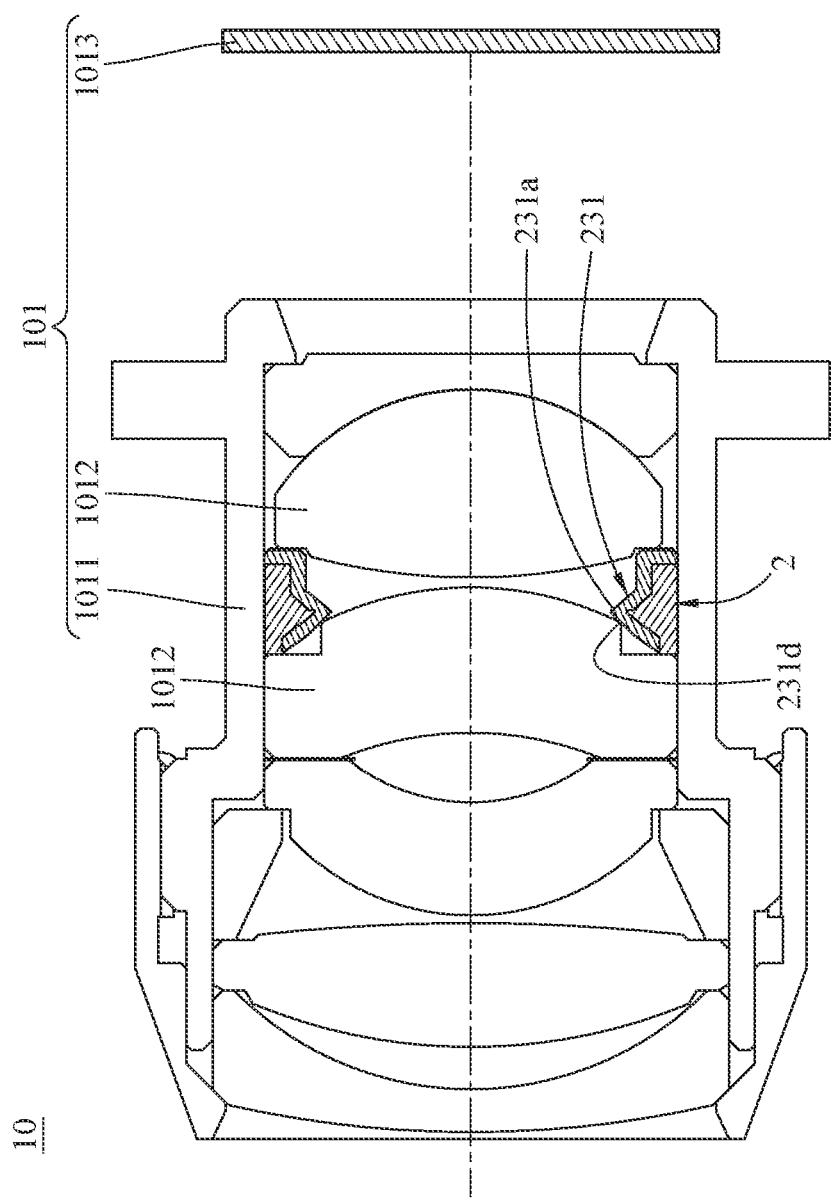
FIG. 21 is a schematic view of a camera lens module according to the 10th embodiment of the present disclosure.

FIG. 21 is a schematic view of a camera lens module according to the 10th embodiment of the present disclosure. In this embodiment, a camera lens module 10 includes the annular optical component 2 disclosed in the 2nd embodiment and an optical lens assembly 101.

The optical lens assembly 101 includes a barrel 1011, multiple lens elements 1012 and an image sensor 1013. The annular optical component 2 and the lens elements 1012 are disposed in the barrel 1011.

The molded anti-reflective layer structure 231 further includes an axial assembling structure 231d. The annular optical component 2 is disposed in the optical lens assembly 101 by the axial assembling structure 231d. Moreover, the axial assembling structure 231d is configured to align the central axis A of the annular optical component 2 with a center of the lens element 1012 adjacent to the annular optical component 2. In this embodiment, among all parts of the molded anti-reflective layer structure 231, only the axial assembling structure 231d is in contact with the lens element 1012 adjacent to the annular optical component 2. The tapered portion 231a is not in contact with the aforementioned lens element 1012.

11th Embodiment

Figure 22:
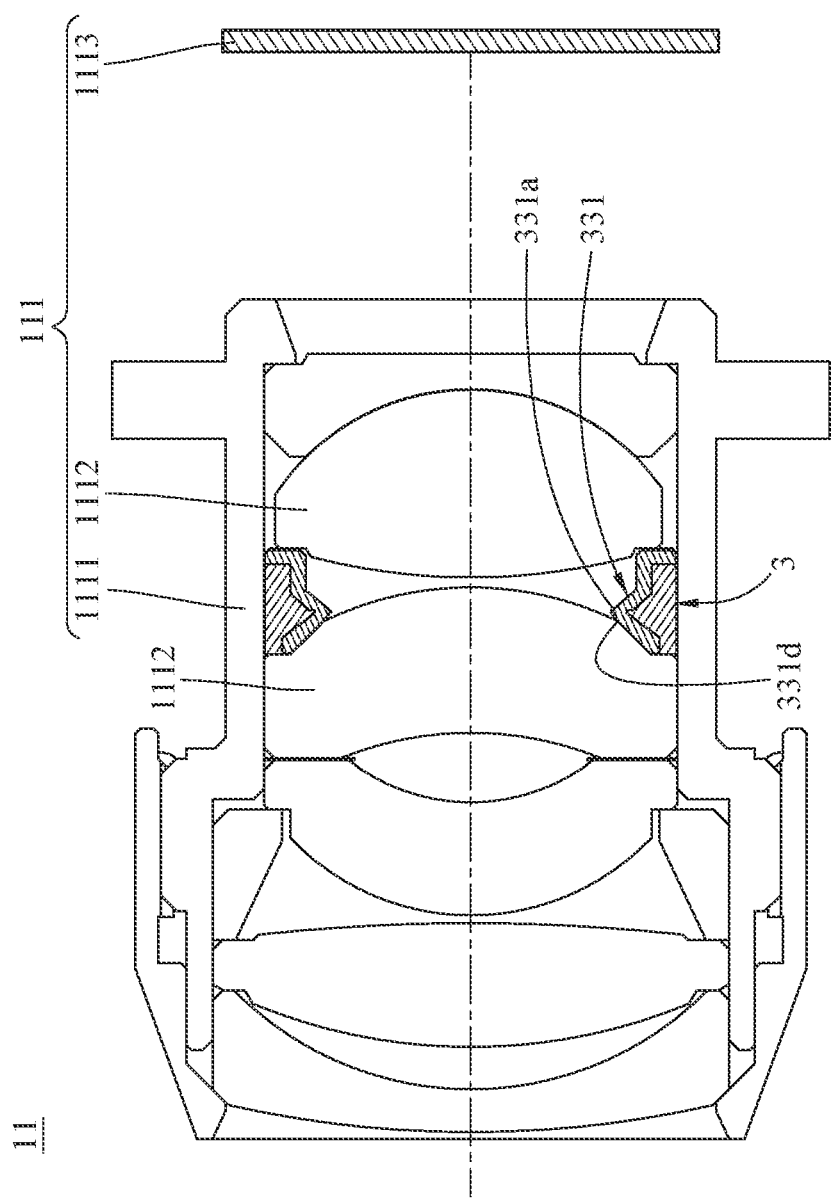
FIG. 22 is a schematic view of a camera lens module according to the 11th embodiment of the present disclosure.

FIG. 22 is a schematic view of a camera lens module according to the 11th embodiment of the present disclosure. In this embodiment, a camera lens module 11 includes the annular optical component 3 disclosed in the 3rd embodiment and an optical lens assembly 111.

The optical lens assembly 111 includes a barrel 1111, multiple lens elements 1112 and an image sensor 1113. The annular optical component 3 and the lens elements 1112 are disposed in the barrel 1111.

The molded anti-reflective layer structure 331 further includes an axial assembling structure 331d. The annular optical component 3 is disposed in the optical lens assembly 111 by the axial assembling structure 331d. Moreover, the axial assembling structure 331d is configured to align the central axis A of the annular optical component 3 with a center of the lens element 1112 adjacent to the annular optical component 3. In this embodiment, both the tapered portion 331a and the axial assembling structure 331d are in contact with the aforementioned lens element 1112.

12th Embodiment

Figure 23:
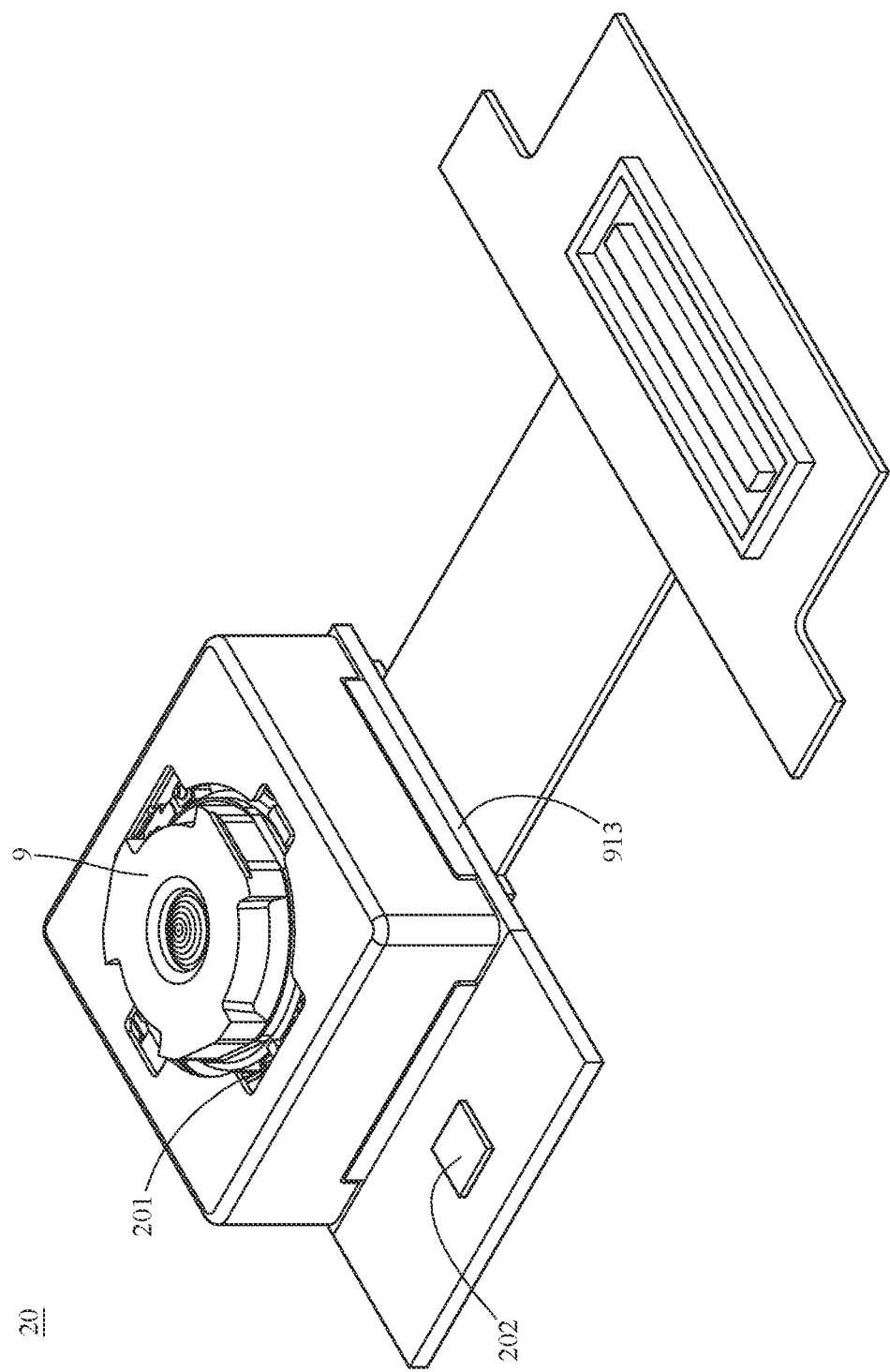
FIG. 23 is a perspective view of an image capturing unit according to the 12th embodiment of the present disclosure.

FIG. 23 is a perspective view of an image capturing unit according to the 12th embodiment of the present disclosure. In this embodiment, an image capturing unit 20 includes the camera lens module 9 disclosed in the 9th embodiment, a driving device 201 and an image stabilizer 202. The imaging light converges in the camera lens module 9 of the image capturing unit 20 to generate an image with the driving device 201 utilized for image focusing on the image sensor 913, and the generated image is then digitally transmitted to other electronic component for further processing.

The driving device 201 can have auto focusing functionality, and different driving configurations can be obtained through the usages of voice coil motors (VCM), micro electro-mechanical systems (MEMS), piezoelectric systems, or shape memory alloy materials. The driving device 201 is favorable for obtaining a better imaging position of the camera lens module 9, so that a clear image of the imaged object can be captured by the camera lens module 9 with different object distances. The image sensor 913 (for example, CCD or CMOS), which can feature high photosensitivity and low noise, is disposed on the image surface of the photographing optical lens system to provide higher image quality.

The image stabilizer 202, such as an accelerometer, a gyro sensor and a Hall Effect sensor, is configured to work with the driving device 201 to provide optical image stabilization (OIS). The driving device 201 working with the image stabilizer 202 is favorable for compensating for pan and tilt of the camera lens module 9 to reduce blurring associated with motion during exposure. In some cases, the compensation can be provided by electronic image stabilization (EIS) with image processing software, thereby improving image quality while in motion or low-light conditions.

13th Embodiment

Figure 24:
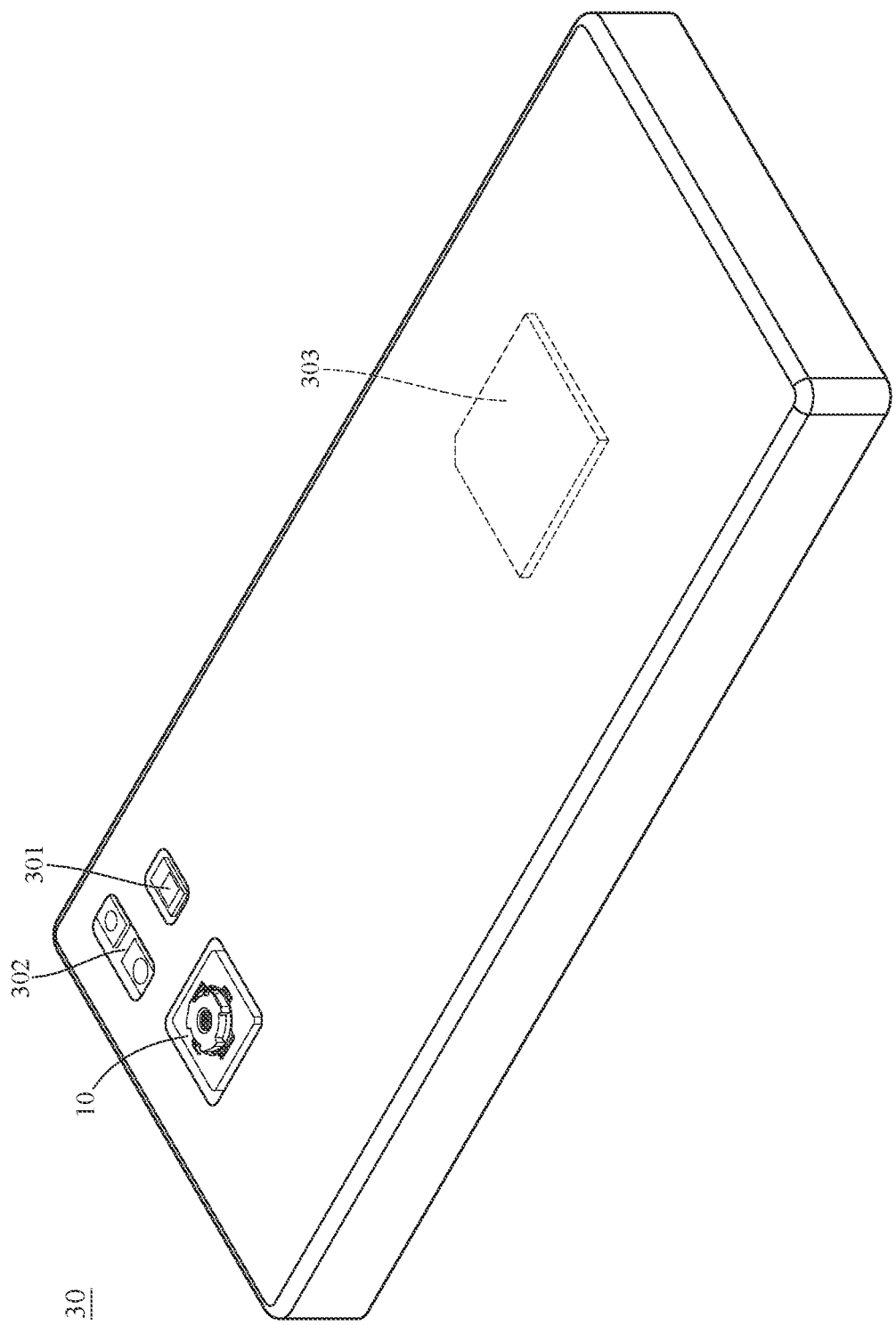
FIG. 24 is a perspective view of an electronic device according to the 13th embodiment of the present disclosure.
Figure 25:
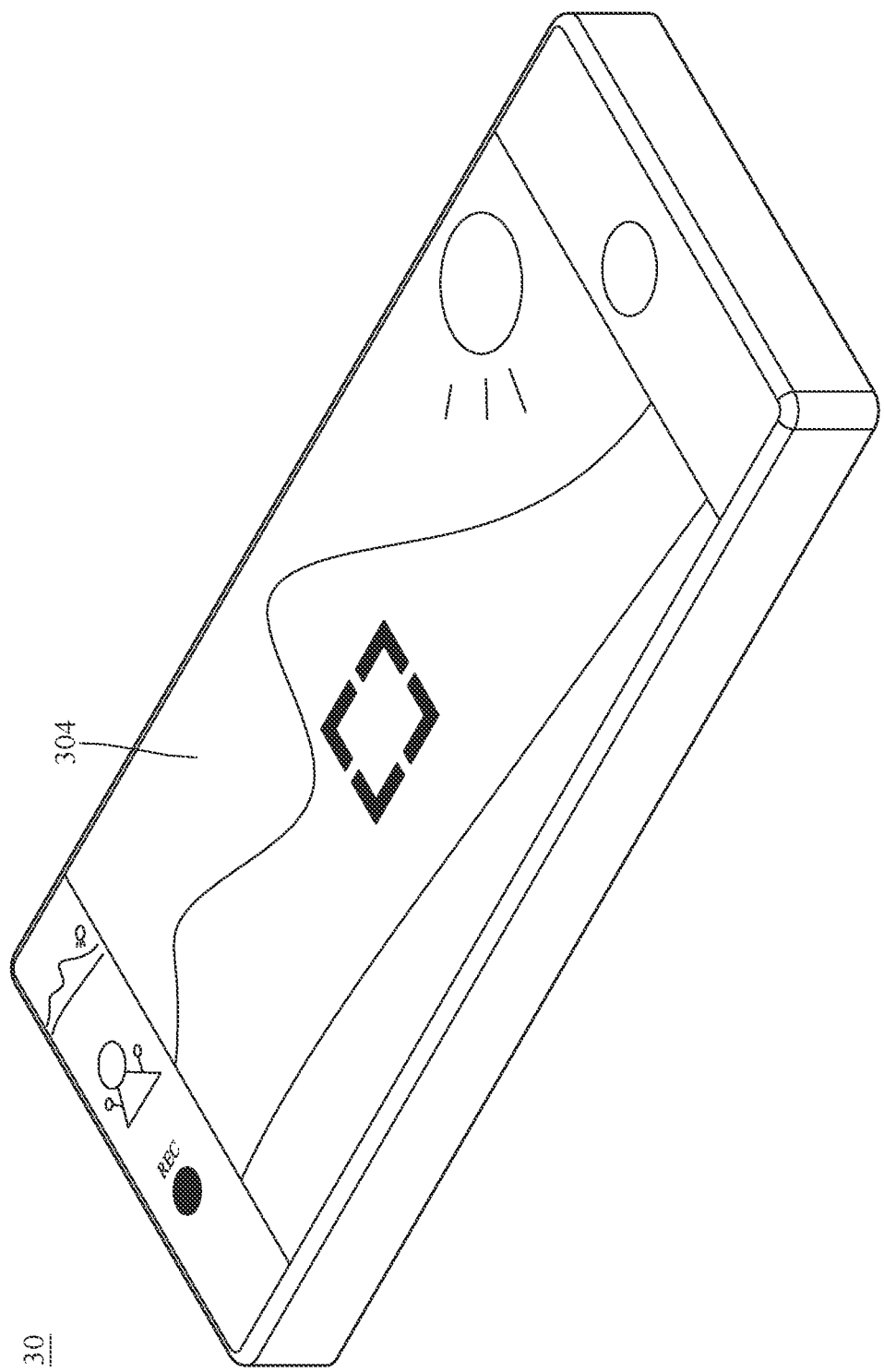
FIG. 25 is another perspective view of the electronic device in FIG. 24.

FIG. 24 is a perspective view of an electronic device according to the 13th embodiment of the present disclosure. FIG. 25 is another perspective view of the electronic device in FIG. 24. In this embodiment, an electronic device 30 is a smartphone including the image capturing unit 20 disclosed in the 12th embodiment, a flash module 301, a focus assist module 302, an image signal processor 303 and a user interface 304. The present disclosure is not limited to the number of image capturing unit.

When a user captures images of an object, the light rays converge in the image capturing unit 20 to generate an image, and the flash module 301 is activated for light supplement. The focus assist module 302 detects the object distance of the imaged object to achieve fast auto focusing. The image signal processor 303 is configured to optimize the captured image to improve image quality. The light beam emitted from the focus assist module 302 can be either conventional infrared or laser. The user interface 304 can be a touch screen or a physical button. The user is able to interact with the user interface 304 and the image software processor having multiple functions to capture images and complete image processing. The image processed by the image software processor can be displayed on the user interface 304.

Figure 26:
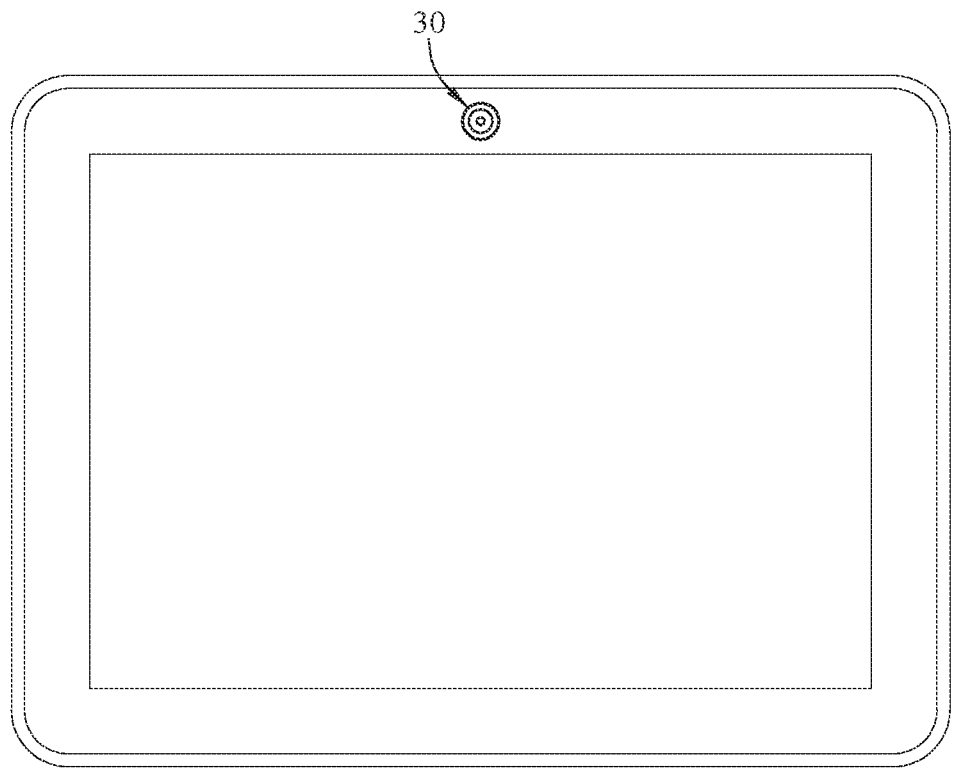
FIG. 26 is a perspective view of an electronic device according to another embodiment of the present disclosure.
Figure 27:
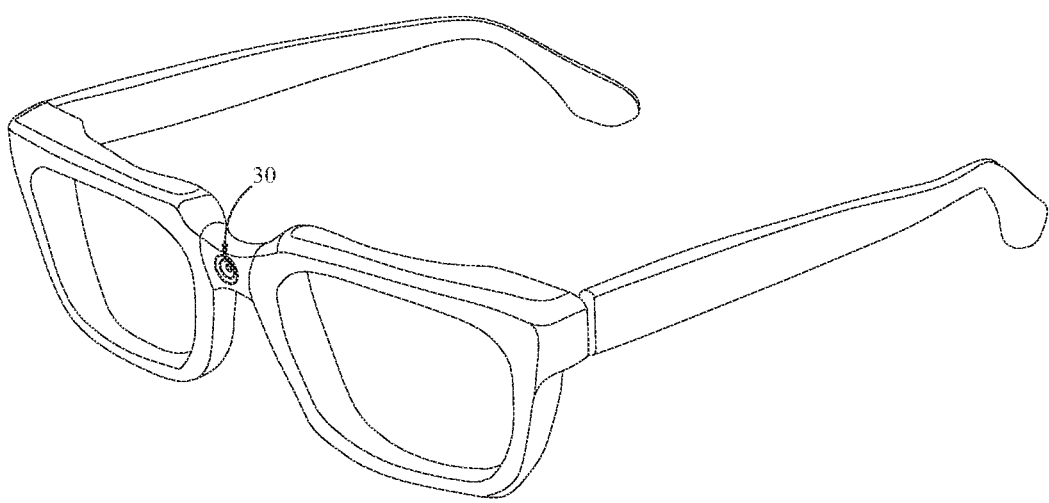
FIG. 27 is a perspective view of an electronic device according to still another embodiment of the present disclosure.
Figure 28:
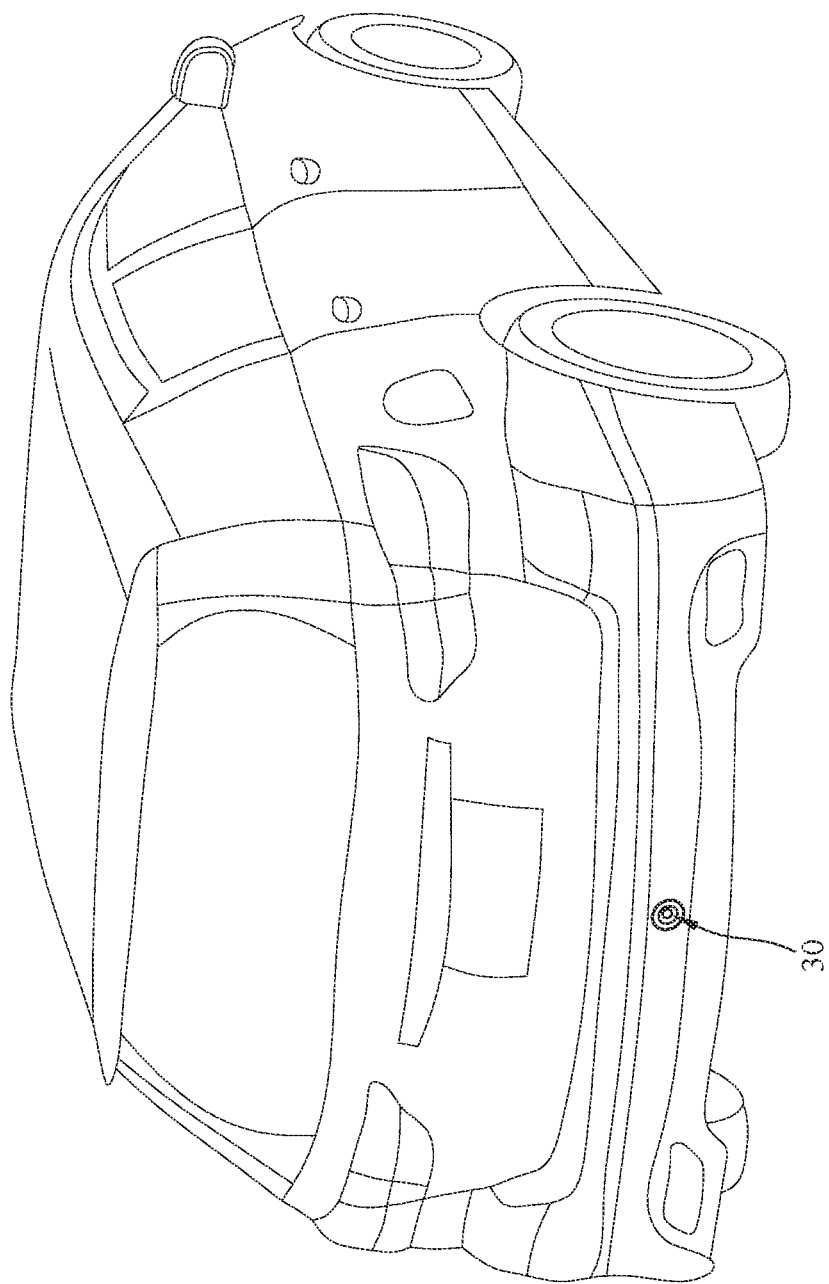
FIG. 28 is a perspective view of an electronic device according to yet another embodiment of the present disclosure.

The smartphone in this embodiment is only exemplary for showing the image capturing unit 20 of the present disclosure installed in an electronic device, including a tablet personal computer (FIG. 26), a wearable device (FIG. 27) or a vehicle backup cameras (FIG. 28), and the present disclosure is not limited thereto. The annular optical component and the camera lens module of the present disclosure can be applied to 3D (three-dimensional) image capturing applications, in products such as digital cameras, mobile devices, digital tablets, smart televisions, network surveillance devices, dashboard cameras, vehicle backup cameras, multicamera devices, image recognition systems, motion sensing input devices, wearable devices and other electronic imaging devices.

The foregoing description, for the purpose of explanation, has been described with reference to specific embodiments. It is to be noted that the present disclosure shows different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An annular optical component, comprising:
   an inner surface comprising a molded anti-reflective layer structure, the molded anti-reflective layer structure surrounding a central axis of the annular optical component, and the molded anti-reflective layer structure defining a central aperture;
   an outer surface comprising a frame structure, the outer surface being opposite to the inner surface, the frame structure surrounding at least a part of the molded anti-reflective layer structure, and a hardness of the frame structure being larger than a hardness of the molded anti-reflective layer structure;
   an object-side surface facing toward an object side of the annular optical component, and the object-side surface being connected to the outer surface and the inner surface; and
   an image-side surface facing toward an image side of the annular optical component, the image-side surface being connected to the outer surface and the inner surface, and the image-side surface being opposite to the object-side surface;
   wherein the molded anti-reflective layer structure is joined with the frame structure, the molded anti-reflective layer structure comprises a tapered portion adjacent to the central aperture, the frame structure comprises a frame tapered portion corresponding to the tapered portion of the molded anti-reflective layer structure, and both of the frame tapered portion of the frame structure and the tapered portion of the molded anti-reflective layer structure taper off along a direction from the outer surface toward the inner surface.

2. The annular optical component of claim 1, wherein one side of the tapered portion closer to the object-side surface tapers off toward the central aperture.

3. The annular optical component of claim 2, wherein another side of the tapered portion closer to the image-side surface tapers off toward the central aperture.

4. The annular optical component of claim 3, wherein a diameter of the outer surface is φo, a minimum diameter of the inner surface is φi, and the following condition is satisfied:
   $1.1 < \varphi o/\varphi i < 3.5$.

5. The annular optical component of claim 3, wherein the tapered portion comprises an angled end.

6. The annular optical component of claim 5, wherein an angle of the angled end is θ, and the following condition is satisfied:
   46 degrees $< \theta <$ 136 degrees.

7. The annular optical component of claim 5, wherein a displacement in parallel with the central axis of the annular optical component between the angled end and the object-side surface is h, a thickness of the annular optical component is d, and the following condition is satisfied:
   $0.1 < h/d < 0.9$.

8. The annular optical component of claim 7, wherein the displacement in parallel with the central axis of the annular optical component between the angled end and the object-side surface is h, the thickness of the annular optical component is d, and the following condition is satisfied:
   $0.3 < h/d < 0.7$.

9. The annular optical component of claim 1, wherein the frame structure comprises at least one notch structure on one side thereof facing toward the object side, and the at least one notch structure extends from the object-side surface toward the image-side surface.

10. The annular optical component of claim 1, wherein the frame structure comprises at least one notch structure on one side thereof facing toward the image side, and the at least one notch structure extends from the image-side surface toward the object-side surface.

11. The annular optical component of claim 10, wherein the molded anti-reflective layer structure is made of resin material, a number of the at least one notch structure is two, the molded anti-reflective layer structure comprises at least two resin gate traces, and the at least two resin gate traces respectively correspond to the two notch structures.

12. The annular optical component of claim 1, wherein the frame structure has uneven thickness, the frame structure tapers off along either a direction from the image-side surface toward the object-side surface or a direction from the object-side surface toward the image-side surface.

13. The annular optical component of claim 1, wherein a thickness of the annular optical component is d, a minimum diameter of the inner surface is φi, and the following condition is satisfied:
   $0.15 < d/\varphi i < 0.8$.

14. The annular optical component of claim 1, wherein the molded anti-reflective layer structure comprises glass fiber.

15. A camera lens module, comprising the annular optical component of claim 1 and an optical lens assembly, wherein the annular optical component is disposed in the optical lens assembly.

16. The camera lens module of claim 15, wherein the molded anti-reflective layer structure comprises an axial assembling structure, the annular optical component is disposed in the optical lens assembly by the axial assembling structure, the optical lens assembly comprises a lens element adjacent to the annular optical component, and the axial assembling structure is configured to align the central axis of the annular optical component with a center of the lens element.

17. The camera lens module of claim 16, wherein only the axial assembling structure is in contact with the lens element among all parts of the molded anti-reflective layer structure.

18. The camera lens module of claim 15, wherein the optical lens assembly comprises a lens element adjacent to the annular optical component, and the molded anti-reflective layer structure is not in contact with the lens element.

19. An annular optical component, comprising:
   an inner surface comprising a molded anti-reflective layer structure, the molded anti-reflective layer structure surrounding a central axis of the annular optical component, and the molded anti-reflective layer structure defining a central aperture;

an outer surface comprising a frame structure, the outer surface being opposite to the inner surface, the molded anti-reflective layer structure being joined with the frame structure, the frame structure surrounding at least a part of the molded anti-reflective layer structure, and a hardness of the frame structure being larger than a hardness of the molded anti-reflective layer structure;

an object-side surface facing toward an object side of the annular optical component, and the object-side surface being connected to the outer surface and the inner surface; and an image-side surface facing toward an image side of the annular optical component, the image-side surface being connected to the outer surface and the inner surface, and the image-side surface being opposite to the object-side surface;

wherein the molded anti-reflective layer structure comprises a tapered portion adjacent to the central aperture, the frame structure comprises a frame tapered portion corresponding to the tapered portion of the molded anti-reflective layer structure, and both of the frame tapered portion of the frame structure and the tapered portion of the molded anti-reflective layer structure taper off along a direction from the outer surface toward the inner surface.

20. The annular optical component of claim 19, wherein the central aperture is non-circular.

21. The annular optical component of claim 20, wherein the central aperture has at least two arc sides.

22. The annular optical component of claim 20, wherein the central aperture has at least two straight sides.

23. The annular optical component of claim 19, wherein the molded anti-reflective layer structure comprises a molded surface structure.

24. The annular optical component of claim 23, wherein the molded surface structure comprises a plurality of straight protrusions.

25. The annular optical component of claim 23, wherein the molded surface structure comprises a plurality of annular protrusions.

* * * * *